United States Patent
Tabuchi et al.

(10) Patent No.: US 6,332,842 B1
(45) Date of Patent: Dec. 25, 2001

(54) ROTATION TRANSMITTER HAVING TORQUE LIMITING MECHANISM

(75) Inventors: Yasuo Tabuchi, Toyoake; Toshihiro Hayashi, Chiryu; Yuuichi Aoki, Chita-gun; Manabu Saiki, Anjo; Junichi Ohguchi, Toyoake; Takuo Sakai, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/597,831

(22) Filed: Jun. 19, 2000

(30) Foreign Application Priority Data

Jun. 21, 1999 (JP) .................................... 11-174437
Jul. 28, 1999 (JP) .................................... 11-213407
Sep. 28, 1999 (JP) .................................... 11-273614
Dec. 17, 1999 (JP) .................................... 11-358430

(51) Int. Cl.$^7$ ........................................... F16D 9/00
(52) U.S. Cl. ............................. 464/33; 464/32; 417/319; 403/11; 403/41
(58) Field of Search .......................... 417/319; 192/56.5, 192/56.56; 403/11, 12, 41, 42; 464/32, 33

(56) References Cited

U.S. PATENT DOCUMENTS

| 2,388,186 | * | 10/1945 | Rowsey | 464/33 |
|---|---|---|---|---|
| 2,438,676 | * | 3/1948 | Nickle et al. | 464/33 |
| 4,859,156 | * | 8/1989 | Kikuchi | 417/319 |
| 5,443,372 | * | 8/1995 | Kanoll | 417/319 |
| 5,683,299 |  | 11/1997 | Kishibuchi et al. . | |
| 5,800,137 | * | 9/1998 | Eitai et al. | 464/32 |
| 5,899,811 |  | 5/1999 | Kishibuchi et al. . | |
| 6,068,452 | * | 5/2000 | Okada et al. | 417/319 |

FOREIGN PATENT DOCUMENTS 10-47244    2/1998   (JP) .

* cited by examiner

*Primary Examiner*—Lynne H. Browne
*Assistant Examiner*—Aaron Dunwoody
(74) *Attorney, Agent, or Firm*—Pillsbury Winthrop LLP

(57) ABSTRACT

A torque limiting mechanism includes an axial space formed in a cylindrical wall of a pulley, and a pin protruding and extending from a back surface of a discharge disc. The pin is inserted into the axial space, and a rubber damper is installed between the inner surface of the axial space and the pin. When torque difference between the pulley and the discharge disc exceeds a threshold, a root portion of the pin is broken to separate the discharge disc from the pulley, thereby interrupting rotation transmission from the pulley to the discharge disc.

9 Claims, 29 Drawing Sheets

ROTATION TRANSMITTER HAVING TORQUE LIMITING MECHANISM

CROSS REFERENCE TO RELATED APPLICATION

This application is based on Japanese Patent Application Nos. Hei. 11-174437 filed on Jun. 21, 1999, Hei. 11-213407 filed on Jul. 28, 1999, Hei. 11-273614 filed on Sep. 28, 1999, and Hei. 11-358430 filed on Dec. 17, 1999.

BACKGROUND OF THE INVENTION

1. Field of the Invention

The present invention relates to a rotation transmitter suitable for use in a compressor of an automotive air conditioning system.

2. Description of Related Art

An automotive air conditioning system, having a compressor which has a variable refrigerant discharge capacity from 0% through 100%, dispenses with an electromagnetic clutch to drive the compressor. However, in the clutch-less compressor, when the compressor shaft locks because the compressor seizes and excess load torque (shock torque) arises, the pulley driving the compressor shaft stops rotating. Thus, a V-belt driven by the engine slides against the pulley, thereby breaking the V-belt.

For solving this problem, a rotation transmitter including a torque limiting mechanism is used for interrupting the rotation transmission from the engine to the compressor when excess load torque arises due to compressor shaft lock. Here, excess load torque means that the torque difference between the pulley and the compressor shaft exceeds a threshold.

The rotation transmitter includes a pulley, an outer hub, a flange, an inner hub, and a plurality of friction plates. The pulley rotates by receiving rotation force from the engine through the V-Belt. The outer hub is connected to the pulley, and the flange is connected to the outer hub through a rubber damper. The inner hub is connected to the compressor shaft, and the plurality of friction plates are provided between the flange and the inner hub. When the compressor shaft is locked to create the excess load torque, the rotation transmission from the flange to the inner hub is interrupted. The pulley, outer hub, flange, inner hub, and friction plates are made of metal such as iron.

However, the number of parts for the torque limiting mechanism is large, thereby increasing the cost of the product. The friction plates are provided in the axial direction, thereby enlarging the axial dimension of the torque limiting mechanism. Further, most of the parts of the rotation transmitter are made of metal such as iron, thereby increasing the weight of the entire rotation transmitter.

JP-A-10-47244 discloses another conventional rotation transmitter. The rotation transmitter also includes a torque limiting mechanism interrupting rotation transmission when the compressor shaft is locked. The torque limiting mechanism includes an intermediate member having an elastically transforming portion made of thermoplastic resin. The intermediate member is connected to one of the pulley and the hub, and press-connected to the other to rotate therewith. When the compressor operates normally, the elastically transforming portion absorbs torque pulsations from the compressor shaft. When excess load torque arises (when the shaft is locked), friction heat caused by slide friction at the press-connection surface melts the elastically transforming portion, thereby interrupting the excess load torque transmission from the shaft to the pulley.

However, this conventional rotation transmitter requires a large number of parts, and a space where the intermediate member is provided in front of a bearing supporting the pulley, thereby enlarging an entire size of the rotation transmitter.

SUMMARY OF THE INVENTION

An object of the present invention is to reduce the size, weight, and production cost of a rotation transmitter including torque limiting mechanism.

According to a first aspect of the present invention, a torque limiting mechanism is disposed within an axial dimension of a driving side rotary member (cylindrical wall of a pulley). Thus, the axial dimension of the rotation transmitter can be reduced in comparison with a conventional rotation transmitter, thereby reducing the entire size of the rotation transmitter having the torque limiting mechanism.

According to a second aspect of the present invention, a torque limiting mechanism includes an axial space formed in the pulley, and a pin protruding and extending from a discharge disc. The pin is inserted into the axial space, and is broken when an excess torque arises between the pulley and the discharge disc. That is, since the torque limiting mechanism is integrally provided within the pulley and the discharge disc, the torque limiting mechanism can be attained without plural friction plates. Thus, the number of parts and assembly process for the torque limiting mechanism are reduced, thereby reducing the price of the product. Further, the discharge disc is made of resin which is lighter and cheaper than metal material such as iron, thereby reducing the weight and the manufacturing cost of the entire rotation transmitter.

According to a third aspect of the present invention, a hub connected to a rotating shaft of rotary machine includes a torque limiting mechanism. That is, a break portion, which is broken when the excess load torque arises between the pulley and the hub, is provided in the hub. Thus, the torque limiting mechanism is simplified, and the number of parts and assembly process for the torque limiting mechanism are reduced, thereby reducing the cost of the product.

According to a fourth aspect of the present invention, a rotation transmitter includes a first hub and a second hub. The first hub rotates by receiving rotation force from a pulley. The second hub is connected to a rotating shaft of rotary machine and rotates by receiving rotation force from the first hub. When excess load torque arises between the first and second hubs, a connection portion therebetween is broken because at least one of these hubs is made of resin or sintered metal. That is, the torque limiting mechanism is attained without adding supplemental parts. Thus, the torque limiting mechanism is simplified, and the number of parts therefor is reduced, thereby reducing the size of the rotation transmitter having the torque limiting mechanism.

According to a fifth aspect of the present invention, a rotation transmitter includes a hub made of resin or sintered metal. The hub rotates by receiving a rotation force from a pulley. The hub is connected to a rotating shaft of rotary machine. When excess load torque arises between the hub and the rotating shaft, a connection portion therebetween is broken because the hub is made of resin or sintered metal. That is, the torque limiting mechanism is attained without adding supplemental parts. Thus, the torque limiting mechanism is simplified, and the number of parts therefor is reduced, thereby reducing the size of the rotation transmitter having the torque limiting mechanism.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

First Embodiment

Figure 1:
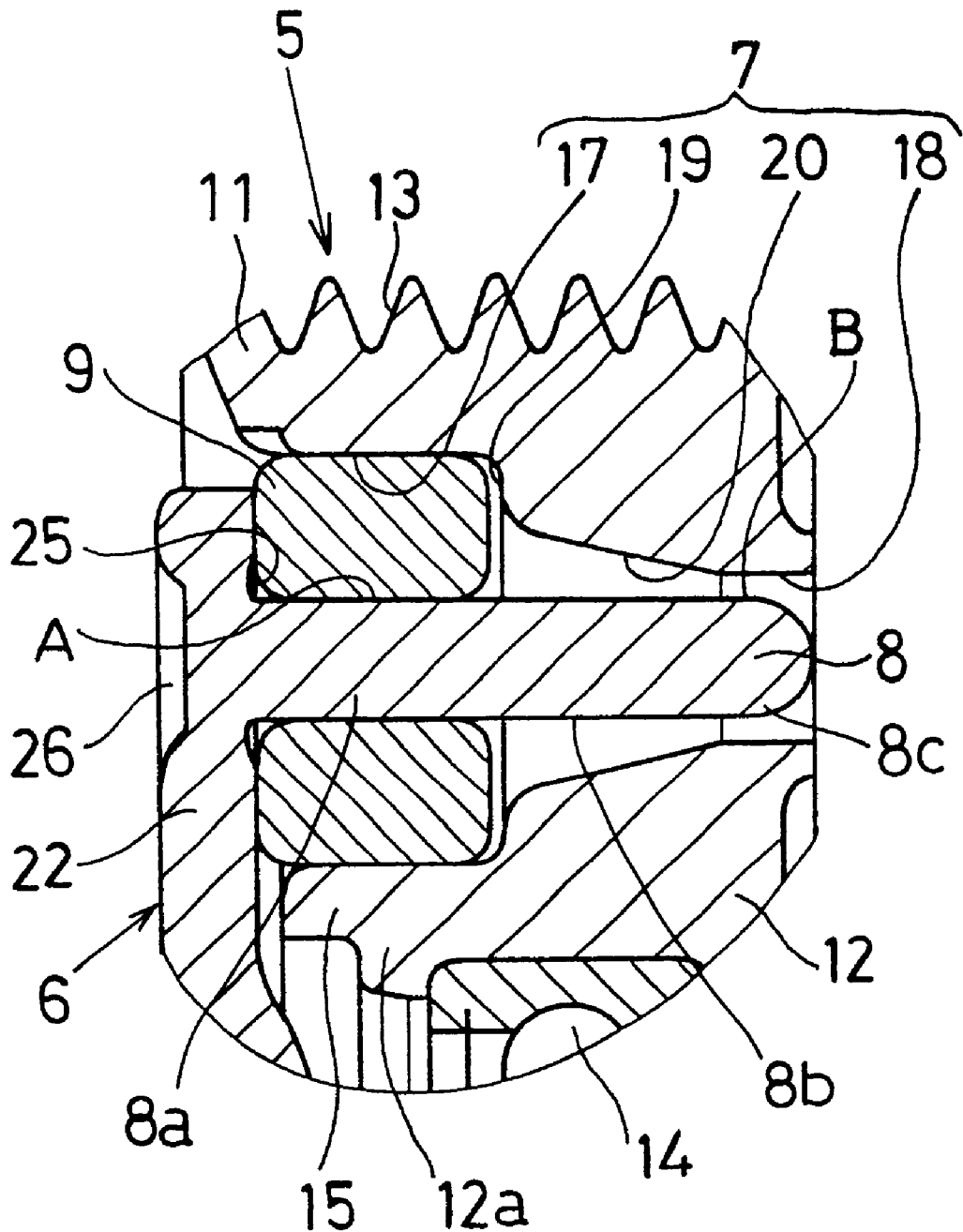
FIG. 1 is a cross-sectional view showing a principal portion of a rotation transmitter (first embodiment)
Figure 2:
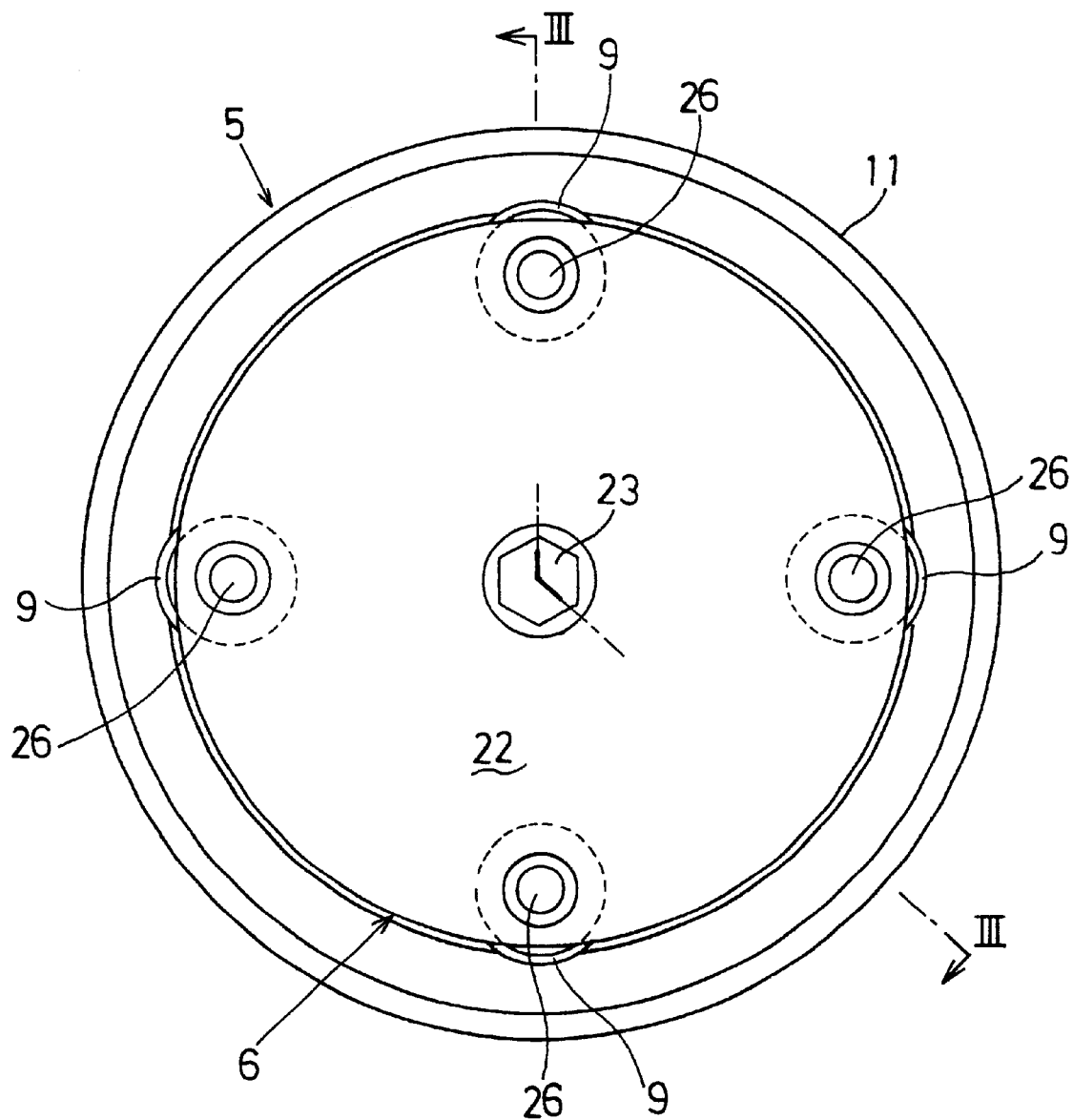
FIG. 2 is a front view showing the rotation transmitter (first embodiment)
Figure 3:
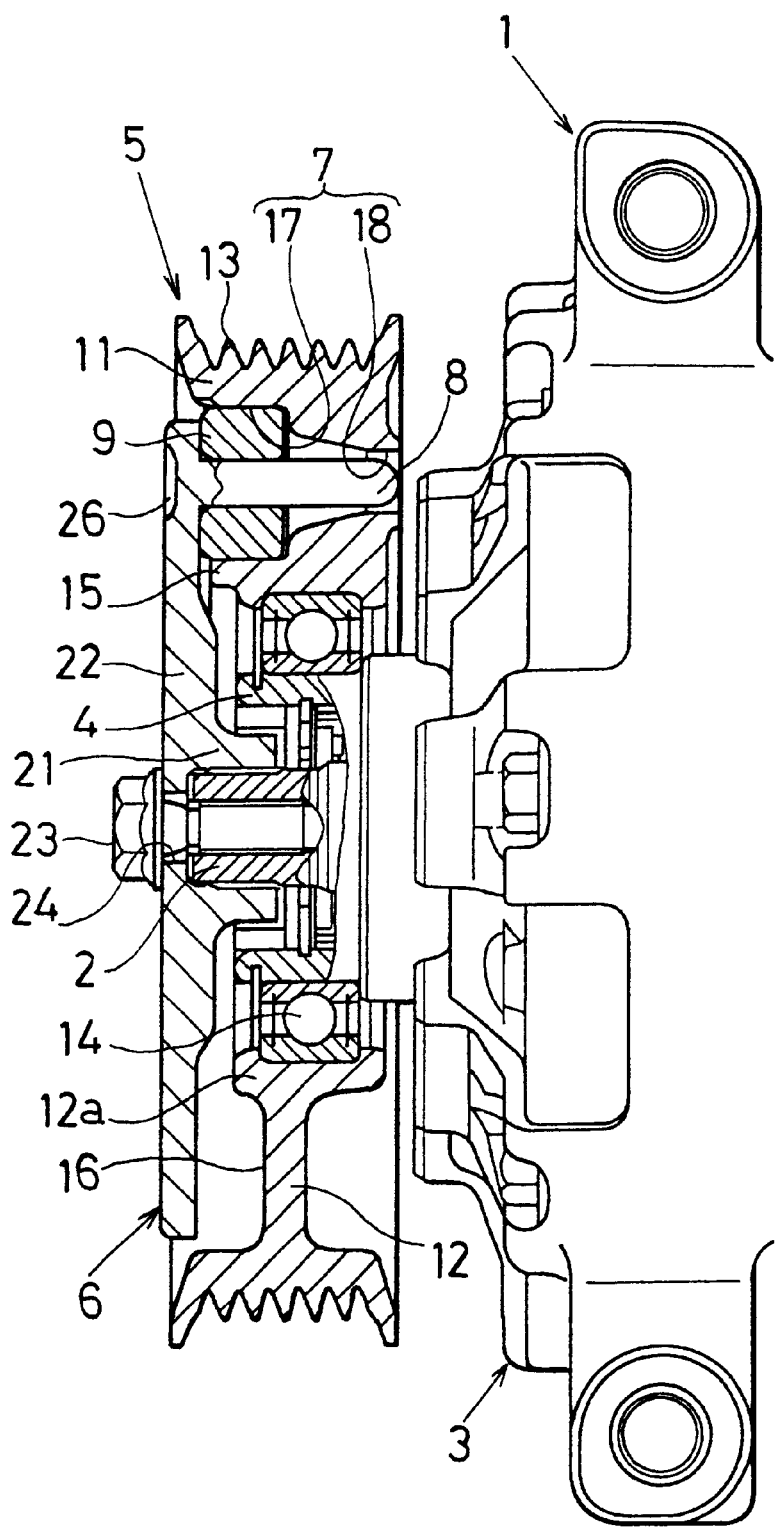
FIG. 3 is a cross-sectional view taken along line III—III in FIG. 2 (first embodiment)
Figure 4:
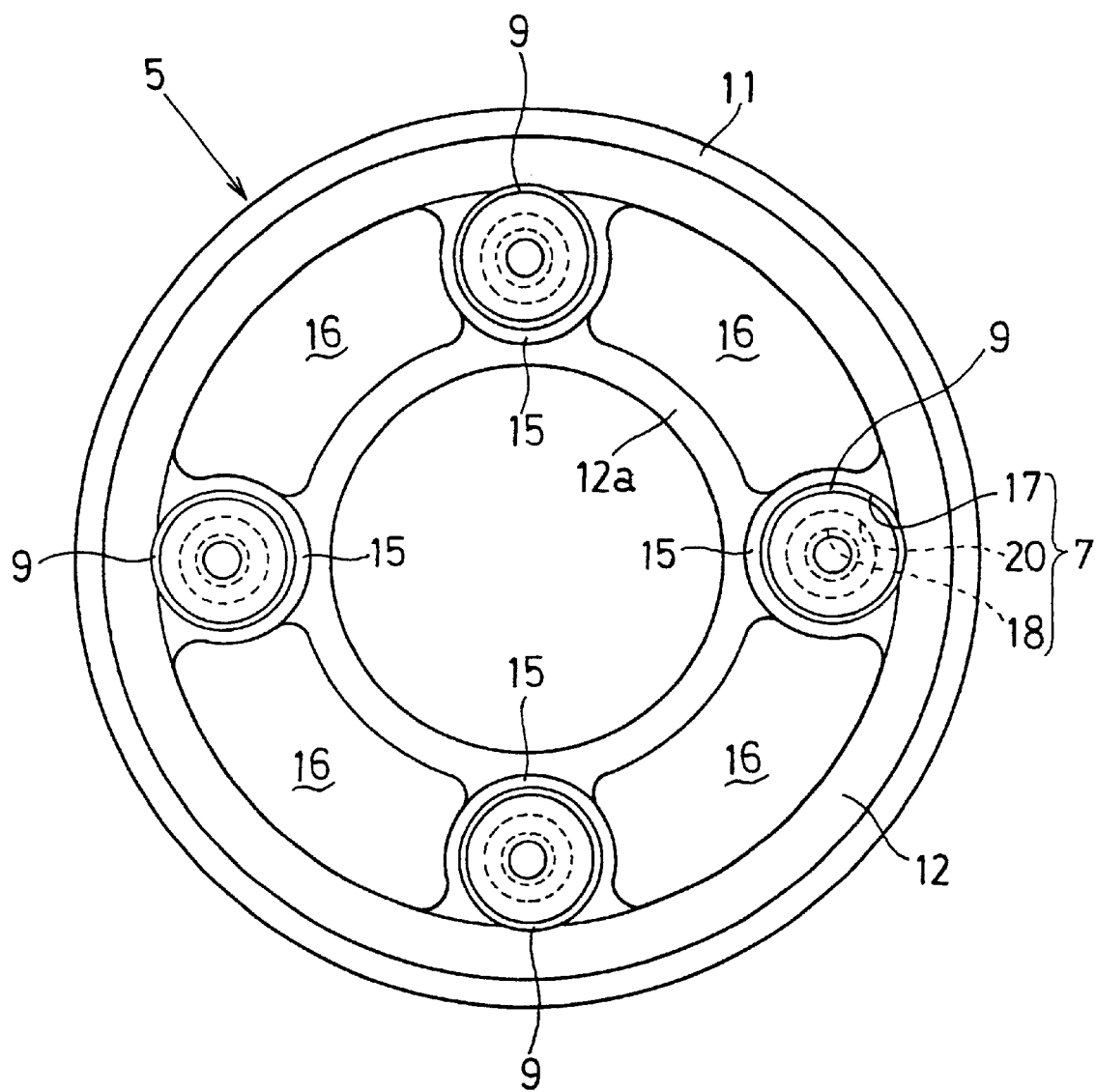
FIG. 4 is a front view showing the rotation transmitter and rubber dampers (first embodiment)
Figure 5:
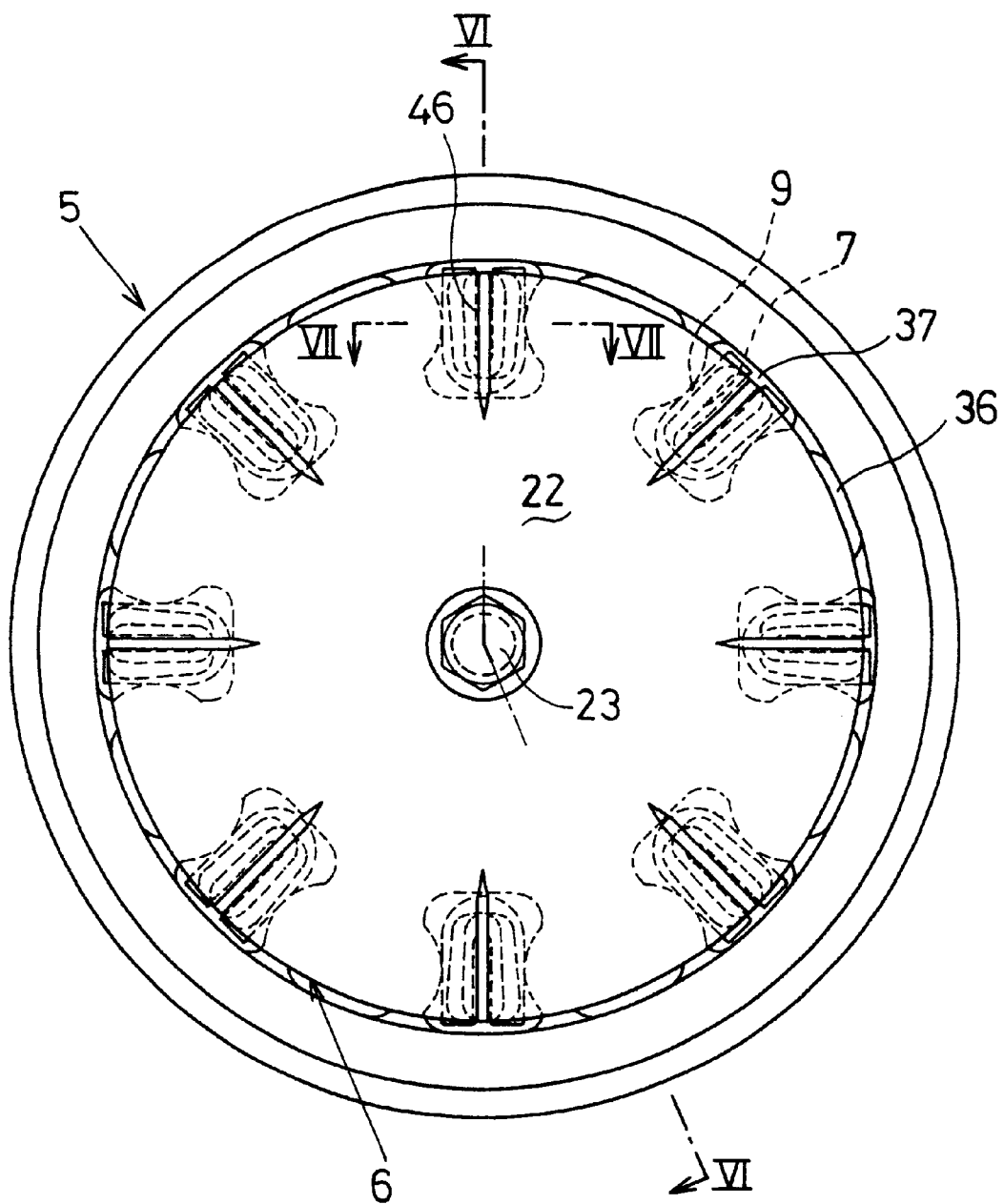
FIG. 5 is a front view showing a rotation transmitter (second embodiment)
Figure 6:
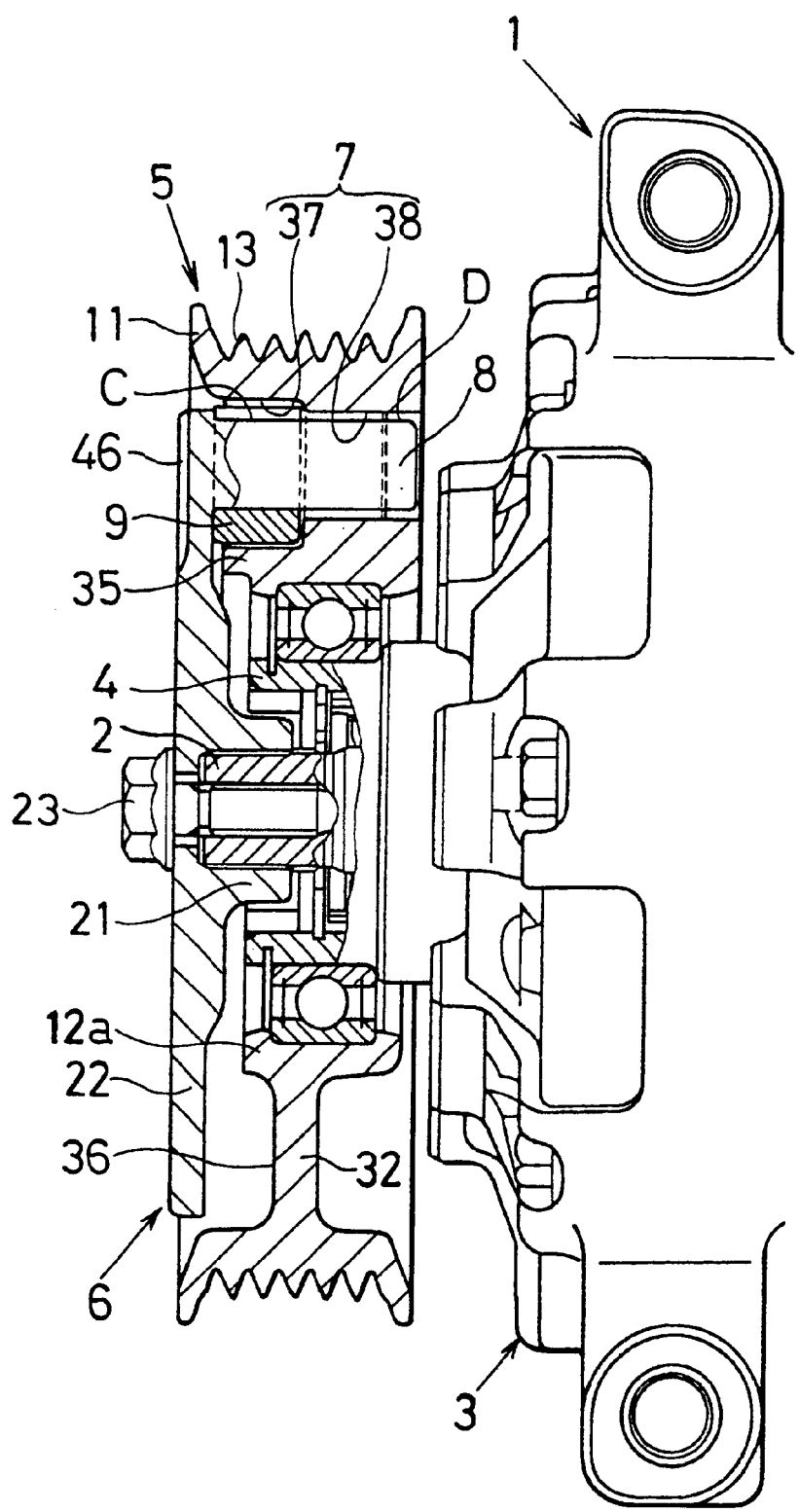
FIG. 6 is a cross-sectional view taken along line VI—VI in FIG. 5 (second embodiment)

The first embodiment will be described with reference to FIGS. 1–4. FIG. 1 shows primary elements of a rotation transmitter of the present embodiment, and FIGS. 2 and 3 show the entire structure of the rotation transmitter.

The rotation transmitter is disposed in a vehicle engine compartment where a vehicle engine is installed. The rotation transmitter transmits a rotation force of the engine to a refrigerant compressor 1, which is an element of an automotive air conditioning system.

The compressor 1, which is just one example of a rotary machine in the present invention, has a variable refrigerant discharge capacity from 0% through 100%. The compressor 1 includes a compressor housing 3 and a rotation shaft 2 rotatably supported by the compressor housing 3. The compressor housing 3 includes a cylindrical protrusion portion 4 protruding toward the inner periphery of the rotation transmitter. The compressor 1 suctions the refrigerant from an evaporator, and compresses it into high-temperature and high-pressure refrigerant. The compressed refrigerant is discharged into a condenser.

Here, a multistage V-belt (not illustrated) is wrapped around a pulley 5 of the rotation transmitter as well as around a crank pulley of the vehicle engine and other pulleys of auxiliary machines (for example, electric generator, water pump, power steering fluid pump).

The rotation transmitter includes the pulley 5, a discharge disc 6, a plurality of axial spaces 7 formed in the pulley 5, a plurality of pins 8 protruding from the rear surface of the discharge disc 6, and a plurality of rubber dampers 9. The rubber damper 9 is disposed between the inner periphery of the axial space 7 and the outer periphery of the pin 8.

Further, the rotation transmitter includes a torque limiting mechanism. When the rotation shaft 2 locks because the compressor 1 seizes and an excess load torque (shock torque) arises, the torque limiting mechanism interrupts the rotation transmission from the engine to the rotation shaft 2 of the compressor 1. Here, excess load torque means that the torque difference between the pulley 5 and the discharge disc 6 exceeds a threshold.

The pulley 5 is made of thermosetting resin such as phenol resin, or made of metal such as iron or aluminum.

As shown in FIG. 3, the pulley 5 includes a cylindrical wall 11 and ring like side-wall 12. The cylindrical wall 11 is shaped substantially cylindrically and always rotates while the engine operates. The ring like side-wall 12 extends radially inwardly from the rear end of the cylindrical wall 11. The cylindrical wall 11 has a plurality of V-shaped grooves 13 formed on the outer peripheral surface thereof, which correspond to plural V-shaped grooves formed on the inner peripheral surface of the V-belt.

The side wall 12 includes a cylindrical portion 12a at the inner periphery thereof, which is rotatably supported by the protrusion portion 4 of the compressor housing 3 through a bearing 14. Further, the side wall 12 includes axially thick portions 15 and axially thin portions 16, which are circumferentially and alternately located at 90 degree intervals. Here, the axially thin portions 16 are made thin for reducing material cost.

In each axially thick portion 15, an axial space portion 7, axially penetrating through the thick portion 15, is formed, respectively. In this embodiment, four thick portions 15, having axial spaces 7 are provided. Each axial space 7 includes a transmission hole 17. The rubber damper 9 is installed in the transmission hole 17, and the transmission hole 17 transmits torque during normal operation.

Further, the axial space 7 includes an insertion hole 18 at the rear side (right side in FIG. 1) thereof, into which an end of the pin 8 is loosely inserted. The inner diameter of the insertion hole 18 is smaller than that of the transmission hole 17, and the insertion hole 18 transmits torque while the torque limiting mechanism operates.

As shown in FIG. 1, each axial space 7 includes a stopper 19 and a conical hole 20 between the transmission hole 17 and the insertion hole 18. The stopper 19 prevents the rubber damper 9 from sliding in the axial direction, and the conical hole 20 connects the stopper 19 with the insertion hole 18.

The discharge disc 6 is made of thermoplastic resin such as 66 nylon or made of thermosetting resin such as phenol resin.

The discharge disc 6 includes a boss portion 21, a side wall 22, and four pins 8. The boss portion 21 is connected to the front end of the rotation shaft 2 of the compressor 1. The side wall 22 extends radially outwardly from the boss portion 21. The pins 8 protrude from the radial outer area of the side wall 22 and extends rearwardly. An inner spline is formed at the inner periphery of the boss portion 21 to connect with an outer spline formed at the front end of the shaft 2.

The side wall 22 includes an insertion hole 24 at the center thereof. A fixing bolt 23 is inserted through the insertion hole 24 and screwed into an internal thread formed at the front end of the shaft 2. The head of the fixing bolt 23 fastens the side wall 22 to the front end of the shaft 2 to fix the discharge disc 6 to the shaft 2.

Each pin 8 is cylindrically formed and protrudes from the inside of ring like slit 25 formed at the radial outer area rear side of the side wall 22. Each pin 8 includes a root portion 8a, a primary portion 8b, and an end portion 8c. The root portion 8a is loosely inserted into the transmission hole 17, the primary portion 8b is loosely inserted into the conical hole 20, and the end portion 8c is loosely inserted into the insertion hole 18.

The axial spaces 7 and the pins 8 form the torque limiting mechanism, and are located at 90 degree intervals in the circumferential direction. Axial dimensions of the axial space 7 and the pin 8 are smaller than axial dimension of the cylindrical wall 11 of the pulley 5. That is, the axial space 7 and the pin 8 are disposed within the cylindrical wall 11 in the axial direction.

A plurality of polygonal or circle shaped craters 26 are formed at the radial outer portions of the front side of the side wall 22. These craters 26 are formed at the circumferential location where the pins 8 are located. Due to the craters 26 and the slits 25, when excess load torque (shock torque) arises in the rotation transmitter, the pins 8 are broken at their root portions 8a to separate the pins 8 from the side wall 22 of the discharge disc 6.

Each rubber damper 9 is made of chloride butyl rubber, butadiene-styrene-rubber, natural rubber or the like, and is cylindrically formed. Each rubber damper 9 is installed between the transmission hole 17 of the axial space 7 and the root portion 8a of the pin 8 to absorb torque pulsations from the pulley 5 to the discharge disc 6.

The operation of above-described rotation transmitter having torque limiting mechanism will be explained.

While the compressor 1 operates normally, the transmission holes 17 of the axial spaces 7 are connected to the root portions 8a of the pins 8 through the rubber dampers 9. When the engine operates and the crankshaft thereof rotates, the rotation force (torque) of the engine is transmitted to the cylindrical wall 11 of the pulley 5. At this time, the pins 8 receive a force from the transmission holes 17, which is caused by the torque transmission, at the root portions 8a (point A in FIG. 1) thereof.

In this way, the rotation torque is transmitted from the transmission holes 17 to the pins 8 through the rubber dampers 9, so that the discharge disc 6 rotates with the pulley 5. Thus, the rotation force of the engine is transmitted to the compressor shaft 2, and the compressor 1 operates.

When the rotation shaft 2 locks due to seizure of the compressor 1, the discharge disc 6 stops rotating but the pulley 5 keeps on rotating. Thus, excess load torque (shock torque) arises between the pulley 5 and the discharge disc 6.

That is, when the torque difference between the pulley 5 and the discharge disc 6 exceeds a threshold, the pins 8 receive a force from the insertion holes 18, which is caused by the torque transmission, at the end portions 8c (point B in FIG. 1) thereof.

As the end portions 8c are far from the root portions 8a, large stresses act on the root portions 8a so that the root portions 8a are broken. Then, the side wall 22 of the discharge disc 6 is separated from the pin 8, and the pulley 5 and the rubber damper 9 rotate freely from the discharge disc 6. In this way, when the torque difference between the pulley 5 and the discharge disc 6 exceeds the threshold, the torque limiting mechanism operates to interrupt the torque transmission from the pulley 5 to the discharge disc 6, thereby interrupting the rotation transmission from the engine to the compressor shaft 2.

Here, as the root portions 8a are supported by the rubber dampers 9 and the end portions 8c are supported by the insertion holes 18, the pins 8, broken and separated from the side wall 22, rotate with the pulley 5 and the rubber damper 9.

These rotations of the pins 8 and the rubber dampers 9 with pulley 5 do not prevent the rotation of the pulley 5. That is, when the pins 8 are broken at the root portions 8a, the torque limiting operation is completed, thus interrupting the rotation transmission from the pulley 5 to the discharge disc 6 with certainty.

Thus, even when the torque difference between the pulley 5 and the discharge disc 6 becomes exceeds the threshold, the rotation speed of the pulley 5 is not reduced, so that a speed difference does not arise between the pulley 5 and the V-belt. As a result, the V-belt does not slide against the pulley 5, thereby preventing wear and/or break of the V-belt.

As described above, in the rotation transmitter having torque limiting mechanism in the present embodiment, the discharge disc 6 is made of resin which is lighter and cheaper than metal material such as iron, thereby reducing the weight and the manufacturing cost of the rotation transmitter. Further, as the torque limiting mechanism is integrally provided within the pulley 5 and the discharge disc 6, the torque limiting mechanism can be attained without plural friction plates. Thus, the number of parts and assembly process for the torque limiting mechanism are reduced, thereby reducing the price of the product.

The axial dimensions of the axial spaces 7 and the pins 8 constructing the torque limiting mechanism are set such that the torque limiting mechanism is disposed within the cylindrical wall 11 in the axial direction. Thus, the axial dimension of the rotation transmitter can be reduced in comparison with a conventional rotation transmitter having plural friction plates, thereby reducing an entire size of the rotation transmitter.

When the rotation transmitter shares a V-belt with other auxiliary devices (for example, electric generator, water pump, power steering fluid pump, etc.), and the torque limiting mechanism operates under excess load torque, the pulley can continue to rotate. Therefore, the V-belt does not wear and break, so that the auxiliary devices continuously operate.

Second Embodiment

Figure 7:
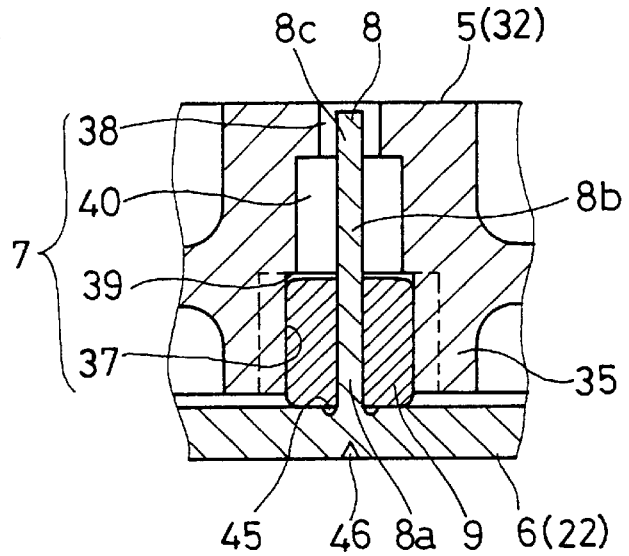
FIG. 7 is a cross-sectional taken along line VII—VII in FIG. 5 (second embodiment)
Figure 8:
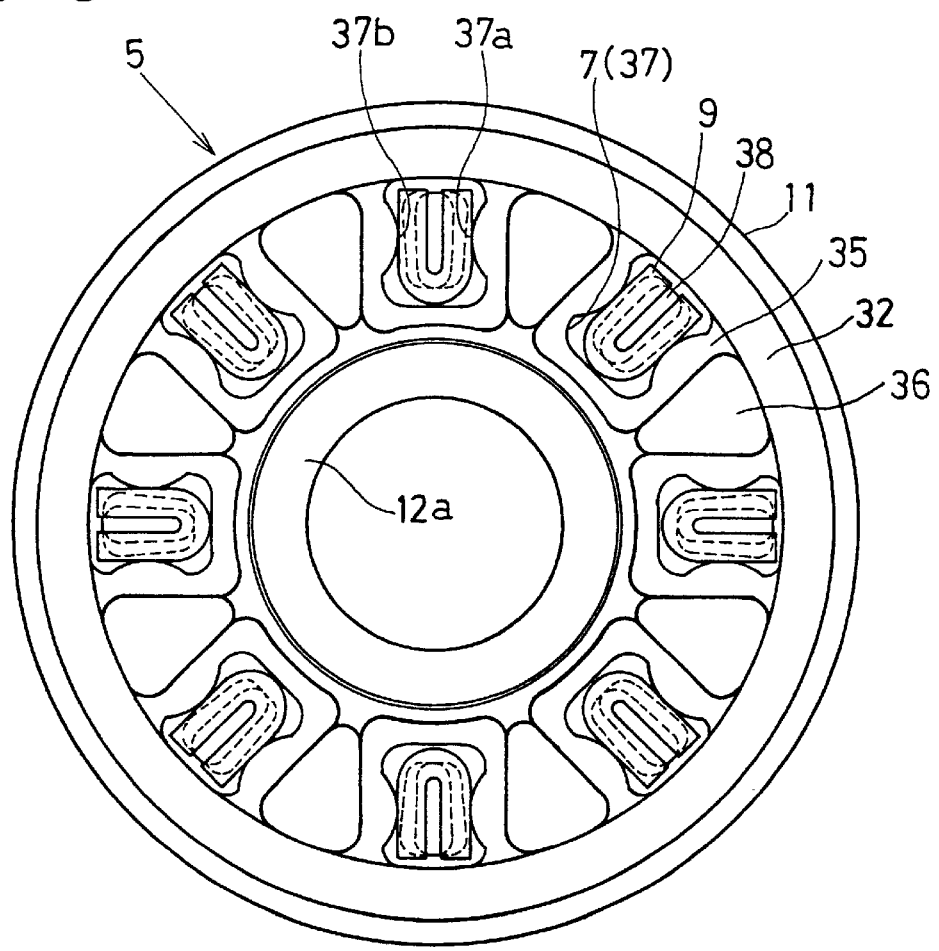
FIG. 8 is a front view showing the rotation transmitter and rubber dampers (second embodiment)

In the second embodiment, as shown in FIGS. 5–8, a pulley 5 includes eight axially thick portions 35. A rectangular axial space 7 is formed in each axially thick portion 35. These thick portions 35 including axial spaces 7 are circumferentially located in a side wall 32 of the pulley 5 at 45 degree intervals. Each axial space 7 includes a transmission hole 37 at the front side (left side in FIG. 6) thereof, and an insertion hole 38 at the rear side (right side in FIG. 6) thereof. The inner diameter of the insertion hole 38 is smaller than that of the transmission hole 37. As shown in FIG. 8, the transmission hole 37 includes projections 37a and 37b. The projections 37a and 37b contact a U-shaped rubber damper 9 in the rotational direction to transmit the torque to the rubber damper 9.

As shown in FIG. 7, each axial space 7 includes a stopper 39 and a connection hole 40 between the transmission hole 37 and the insertion hole 38. The stopper 39 prevents the rubber damper 9 from sliding in the axial direction, and the connection hole 40 connects the transmission hole 37 with the insertion hole 38. Here, the inner diameter of the connection hole 40 is smaller than that of the transmission hole 37 and larger than that of the insertion hole 38. Further, as in the first embodiment, the thick portions 35 are separated by axially thin portions 36 for reducing material cost.

The discharge disc 6 includes eight rectangular shaped plate pins 8. Each pin 8 protrudes from the inside of a ring like slit 45 formed at the radial outer area of the side wall 22 and extends rearwardly. Each pin 8 includes a root portion 8a, a primary portion 8b, and an end portion 8c. The root portion 8a is loosely inserted into the transmission hole 37, the primary portion 8b is loosely inserted into the connection hole 40, and the end portion 8c is loosely inserted into the insertion hole 38.

At the radial outer area front side of the side wall 22, a plurality of needle shaped slits 46 are formed. These needle shaped slits 46 are formed at the circumferential locations where the pins 8 are made. Due to the needle shaped slits 46 and the ring like slits 45, when excess load torque (shock torque) arises in the rotation transmitter, the pins 8 are broken at their root portions 8a to separate the pins 8 from the side wall 22 of the discharge disc 6.

As shown in FIG. 8, each rubber damper 9 is formed in a U-shape. Open ends of the U-shaped rubber damper 9 face radially outwardly, and a closed end thereof faces radially inwardly. Both side walls of the U-shaped rubber damper 9 contact the projections 37a and 37b of the transmission hole 37. In this way, the rubber damper 9 is installed between the transmission hole 37 of the axial space 7 and the root portion 8a of the pin 8.

When the compressor 1 operates normally, the rotation force (torque) of the engine is transmitted to the cylindrical wall 11 of the pulley 5 through the V-belt. At this time, pins 8 receive a force from the projections 37a and 37b, which is caused by torque transmission, at the root portions 8a (point C in FIG. 6) thereof. In this way, rotation torque is transmitted from the pulley 5 to the discharge disc 6 through the rubber dampers 9, so that the discharge disc 6 rotates with the pulley 5.

When the rotation shaft 2 locks due to seizure of the compressor 1, that is, when the torque difference between the pulley 5 and the discharge disc 6 exceeds the threshold, the pins 8 receive a force from the insertion holes 38, which is caused by torque transmission, at the end portions 8c (point D in FIG. 6) thereof.

As the end portions 8c are far from the root portions 8a, large stresses act on the root portions 8a so that the root portions 8a are broken. By this, torque transmission from the pulley 5 to the discharge disc 6 is interrupted, thereby interrupting the rotation transmission from the engine to the compressor shaft 2.

Third Embodiment

Figure 9A:
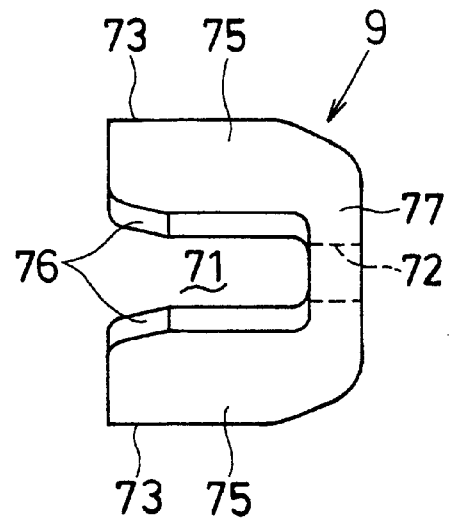
FIG. 9A is a side view showing a rubber damper (third embodiment)
Figure 9B:
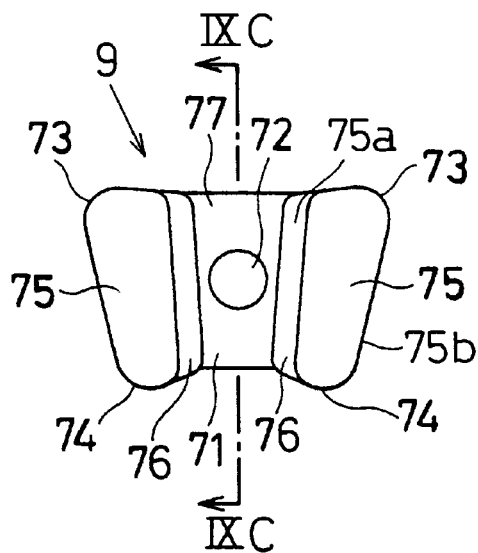
FIG. 9B is a front view showing the rubber damper (third embodiment)
Figure 9C:
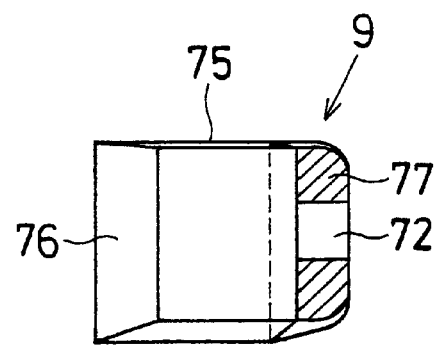
FIG. 9C is a cross-sectional view taken along line IXc—IXc in FIG. 9B (third embodiment)
Figure 10:
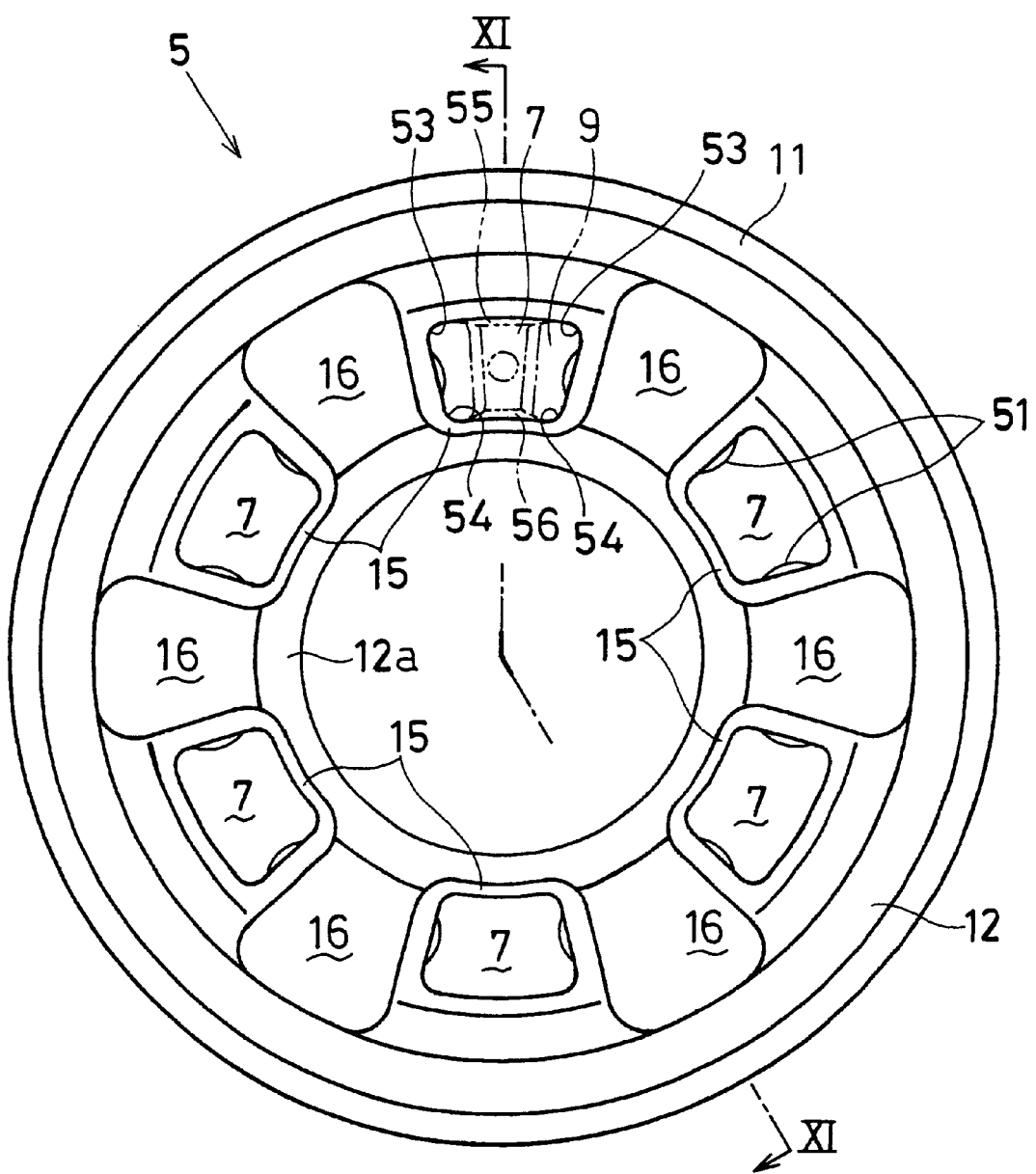
FIG. 10 is a front view showing the rotation transmitter (third embodiment)
Figure 11:
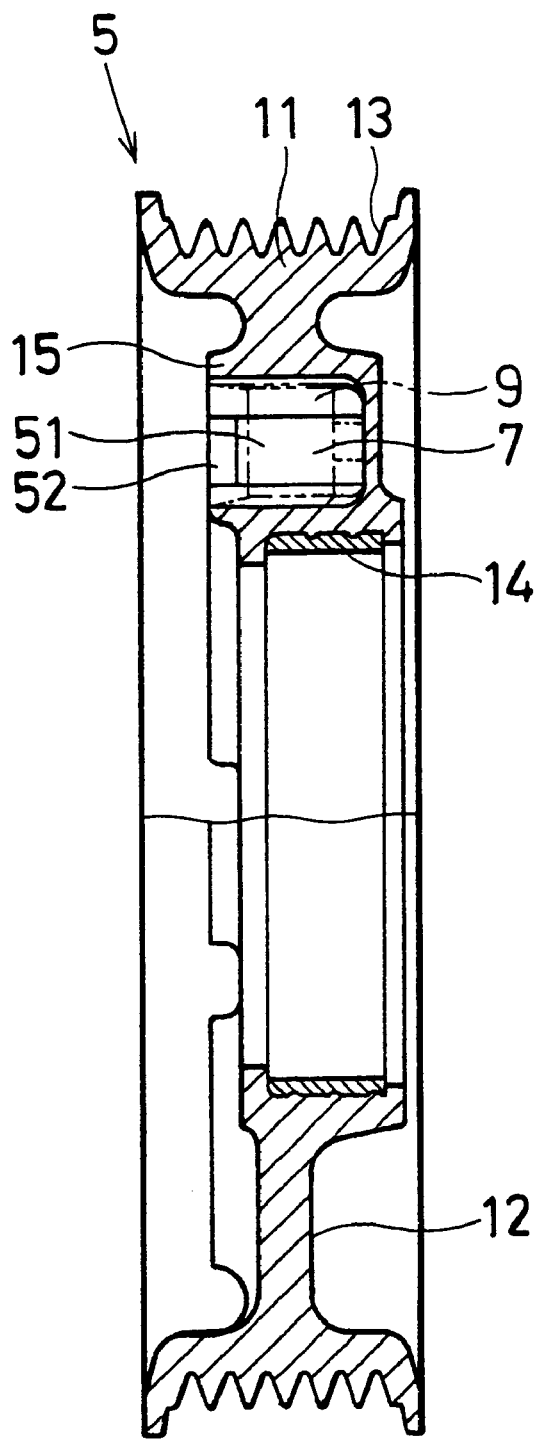
FIG. 11 is a cross-sectional view taken along line XI—XI in FIG. 10 (third embodiment)

In the third embodiment, as shown in FIGS. 9A–12B, a side wall 12 of the pulley 5 includes six axially thick portions 15. An axial space 7 is formed in each axially thick portion 15. As shown in FIG. 10, the axial space 7 narrows circumferentially in the radially inward direction.

As shown in FIG. 10, each inside wall includes a projection 51, that is, a pair of projections 51 are provided in the axial space 7. Each projection 51 presses against the rubber damper 9. The projections 51 transmit the rotation torque to the pins 8 through the rubber dampers 9 while the compressor 1 operates normally. Each projection 51 has a taper 52 at the front end thereof, such that a distance therebetween gradually increases from the rear side to the front side thereof. As a result, the rubber damper 9 is easily inserted into the axial space 7. Here, the projection 51 including taper 52 may be spherically shaped.

As shown in FIG. 10, each axial space 7 includes a pair of outer rounded corners 53 to support radially outer corners 73 of the rubber damper 9, and pair of inner rounded corners 54 to support radially inner corners 74 of the rubber damper 9.

Further, the axial space 7 defines a first gap 55 between the outer inside wall thereof and the rubber damper 9, and a second gap 56 between the inner inside wall thereof and the rubber damper 9. Here, sizes of the first and second gaps are set to adjust the spring characteristic (damper characteristic) of the rubber damper 9.

Figure 12A:
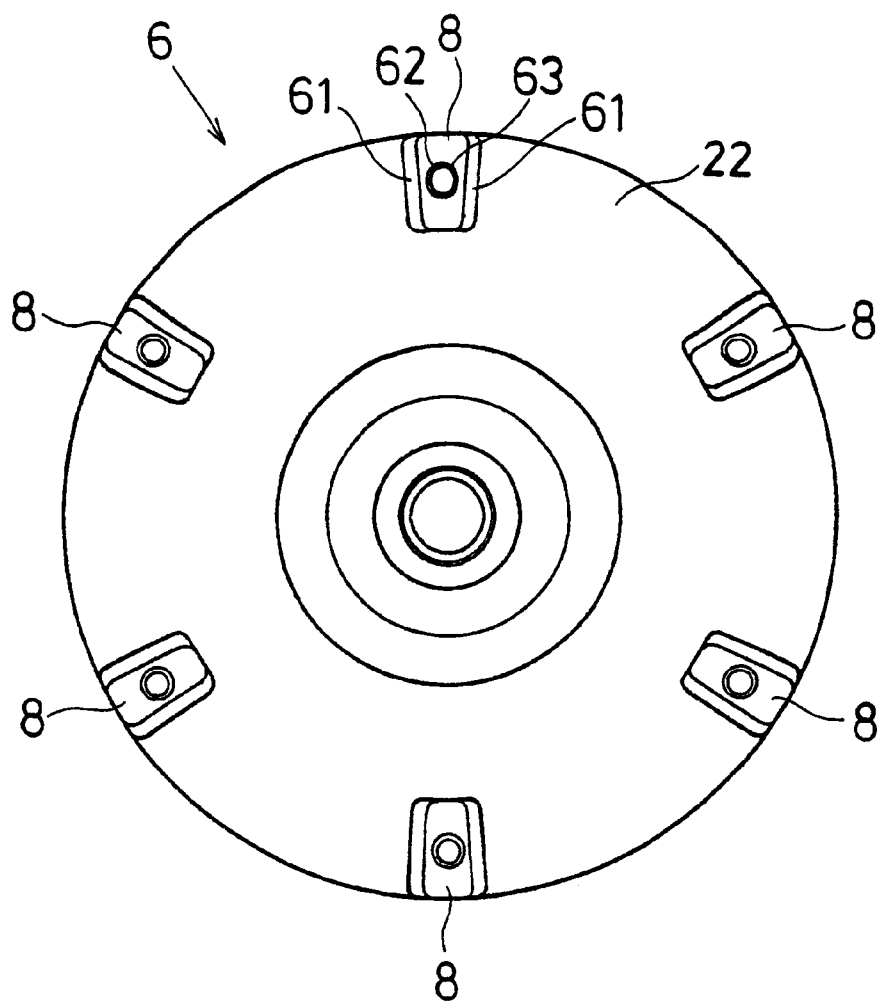
FIG. 12A is a front view showing a discharge disc (third embodiment)
Figure 12B:
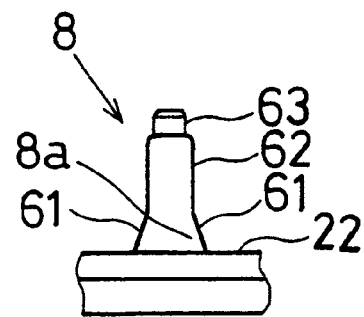
FIG. 12B is a side view showing a principal portion of the discharge disc (third embodiment)

As shown in FIG. 12A, six pins 8 protrude from the radial outer area rear side of the side wall 22 and extend axially to be inserted into the axial spaces 7. As shown in FIG. 12B, each pin 8 includes a root portion 8a and a primary portion 62 having cross-sectional plate shape, and a head portion 63 having cross-sectional circle shape.

Each root portion 8a includes pair of tapers 61 such that the outer diameter thereof gradually decreases rearwardly. Each primary portion 62 is inserted into a center space 71 (see FIGS. 9A and 9B) of one of the rubber dampers 9, and contacts the inner surface of the rubber damper 9. Each head portion 63 is cylindrically shaped and inserted into a circular hole 72 (see FIGS. 9A–9C) of the rubber damper 9.

Each rubber damper 9 is made of chloride butyl rubber, butadiene-styrene-rubber, natural rubber or the like, and is formed in a U-shape. Each rubber damper 9 is installed between the inner wall of the axial space 7 and outer surface of the pin 8.

As shown in FIGS. 9A and 9B, each rubber damper 9 includes pair of outer rounded corners 73 to be supported by the outer rounded corners 53 of the axial space 7, and pair of inner rounded corners 74 to be supported by the inner rounded corners 54 of the axial space 7.

Further, each rubber damper 9 includes pair of wings 75 contacting the inner walls of the axial space 7. The outer surfaces of the pair of wings 75 incline such that a distance therebetween gradually increases radially outwardly. The inner surfaces 75a of the pair of wings 75 also incline such that a distance therebetween gradually increases radially outwardly. Here, as shown in FIG. 9B, an inclination angle of the outer surfaces 75b is larger than that of the inner surfaces 75a. Further, as shown in FIG. 9A, the inner surfaces 75a define tapers 76 at the open ends thereof.

As shown in FIGS. 9A–9C, each rubber damper 9 includes a bottom wall 77 at the rear ends of the pair of wings 75. The bottom wall 77 includes the circle hole 72 at the central area thereof. The rear end surface of the bottom wall 77 contacts the rear side surface of the axial space 7. The head 63 of the pin 8 is inserted into the circle hole 72. The pair of wings 75 and the bottom wall 77 defines the center space 71 having a circumferential dimension slightly smaller than those of the pair of tapers 61 and primary portion 62 of the pin 8.

A method for assembling the discharge disc 6 and the rubber dampers 9 into the pulley 5 will be explained.

The rubber dampers 9 are inserted from the front side into the axial spaces 7 (see two dotted chain lines in FIG. 10). Since the pair of projections 51 have the tapers 52 at the front ends thereof, the rubber dampers 9 are smoothly inserted into the axial spaces 7.

The outer and inner rounded corners 73, 74 of the rubber damper 9 are firmly supported by the rounded corners 53, 54 of the axial space 7, respectively. Thus, the rubber dampers 9 do not slide out of the axial spaces 7, and has a resistance force against the centrifugal force of the pulley 5.

Next, the side wall 22 of the discharge disc 6 is brought close to the side wall 12 of the pulley 5, and the pins 8 are inserted into the axial spaces 7 so that the pair of tapers 61 of each pin 8 contact the pair of tapers 76 of the corresponding rubber damper 9.

Since each rubber damper 9 includes the pair of tapers 76 at the front ends of the wings 75, the head 63 and the primary portion 62 of the pin 8 are smoothly inserted. Further, the head 63 of each pin 8 is inserted into the corresponding hole 72 of the bottom wall 77.

In this way, when the discharge disc 6 is attached to the pulley 5, each rubber damper 9 is pinched between the projections 51 of the axial space 7 and the primary portion 62 of the corresponding pin 8 so that the wings 75 are pressed. Here, alternatively, each rubber damper 9 may be attached to the corresponding pin 8 before the rubber damper 9 is inserted into the axial space 7.

As described above, according to the third embodiment, each pin 8 of the discharge disc 6 is easily inserted into the corresponding axial space 7, thereby improving manufacturing.

Further, when the rubber dampers 9 are inserted into the axial spaces 7, the outer and inner rounded corners 73, 74 are firmly supported by the outer and inner rounded corners 53, 54. Thus, the rubber dampers 9 are easily supported, thereby improving the productivity and quality thereof.

Fourth Embodiment

Figure 13:
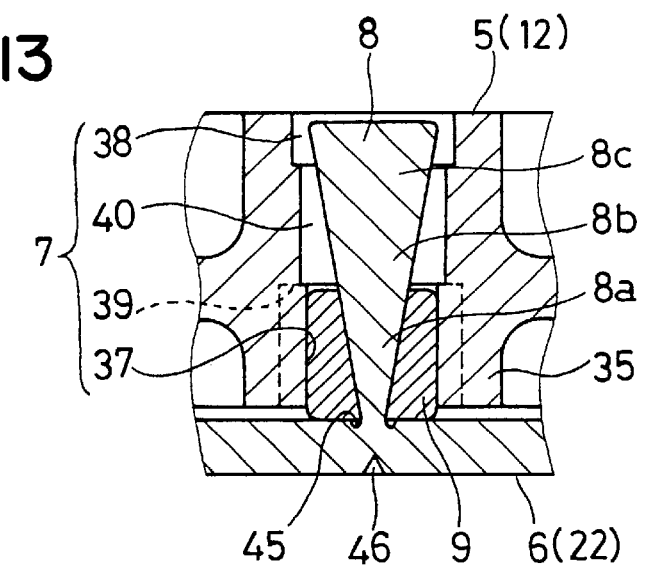
FIG. 13 is a cross-sectional view showing a principal portion of a rotation transmitter (fourth embodiment)

As shown in FIG. 13, in the fourth embodiment, each pin 8 is formed in a conical shape in which the outer diameter thereof gradually increases from the root portion 8a through the end portion 8c. The root portion 8a is loosely inserted into the transmission hole 37, and the end portion 8c is loosely inserted into the insertion hole 38, such that the root portion 8a is broken when the torque limiting mechanism operates. Here, the shape of the axial space 7 may be changed in accordance with the outer shape of the pin 8.

In the above-described first through forth embodiments, the pulley 5 receiving the rotation force from the engine is used as a driving side rotary member, and the discharge disc 6 connected to the compressor shaft 2 is used as a driven side rotary member. Alternatively, a hub connected to the shaft of the engine may be used as a driving side rotary member, and a pulley around which a particular V-belt transmitting rotation force to the shaft of the compressor is wrapped may be used as a driven side rotary member. For example, when the compressor is locked, rotation transmitted from the hub, connected to the engine shaft, to the pulley, around which the V-belt is wrapped, may be interrupted to stop the operation of the V-belt.

Fifth Embodiment

The fifth embodiment will be described with reference to FIGS. 14–17.

A compressor has a refrigerant discharge capacity that can vary from 0% through 100%. The compressor includes a cylindrical compressor housing 101 in which a refrigerant compression mechanism and a variable capacity mechanism are installed, and a rotation shaft 102 rotatably supported by the housing 101.

Figure 14:
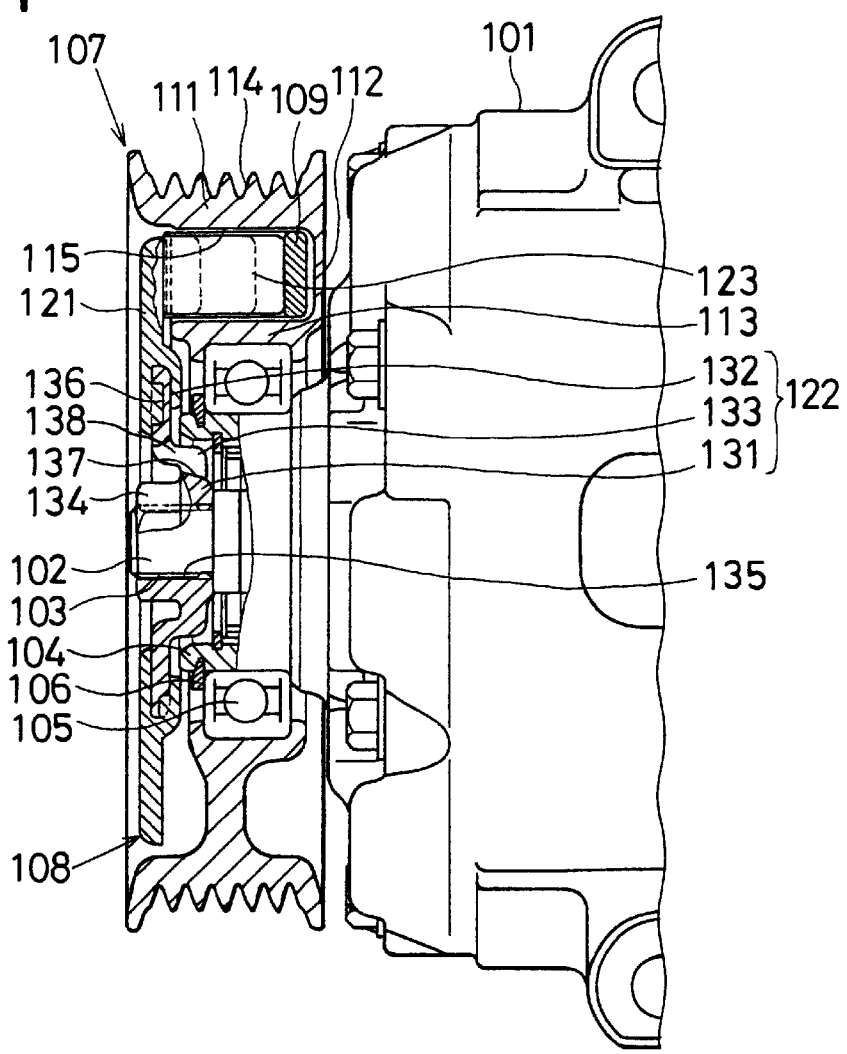
FIG. 14 is a cross-sectional view showing a rotation transmitter (fifth embodiment)

As shown in FIG. 14, the housing 101 includes a front housing, a cylinder, and a rear housing. By rotating the shaft 102, the refrigerant compression mechanism draws the refrigerant from an evaporator, and compresses it into high-temperature and high-pressure refrigerant. The compressed refrigerant is discharged into a condenser. The shaft 102 includes an external thread 103 at the front end thereof.

The housing 101 includes a cylindrical sleeve 104 protruding axially frontwardly. A circular clip 106 is attached to the sleeve 104. A ball bearing 105 is supported by the sleeve 104 and axially fixed between the circular clip 106 and a circular step of the housing 101.

A rotation transmitter includes a pulley 107, a discharge disc 108, and six rubber dampers 109. The pulley 107 always rotates while the engine operates. The discharge disc 108 rotates by receiving rotation torque from the pulley 107. The rubber dampers 109 are disposed between the pulley 107 and the discharge disc 108.

The pulley 107 is made of thermosetting resin such as phenol resin, or made of metal such as iron or aluminum.

As shown in FIG. 14, the pulley 107 includes a cylindrical wall 111, a ring like side-wall 112, and a bearing supporter 113. The cylindrical wall 111 is shaped substantially cylindrically and always rotates while the engine is driven. The ring like side-wall 112 extends radially inwardly from the rear end of the cylindrical wall 111. The bearing supporter 113 is formed radially inside the cylindrical wall 111, and supports the outer race of the ball bearing 105.

A multi-stage V-belt is wrapped around the cylindrical wall 111. The cylindrical wall 111 has a plurality of V-shaped grooves 114 formed on the outer peripheral surface thereof, which correspond to plural V-shaped grooves formed on the inner peripheral surface of the V-belt. The V-belt is also wrapped around a crank pulley of the vehicle engine and other pulleys of auxiliary devices (for example, electric generator, water pump, power steering fluid pump, etc.)

Figure 16:
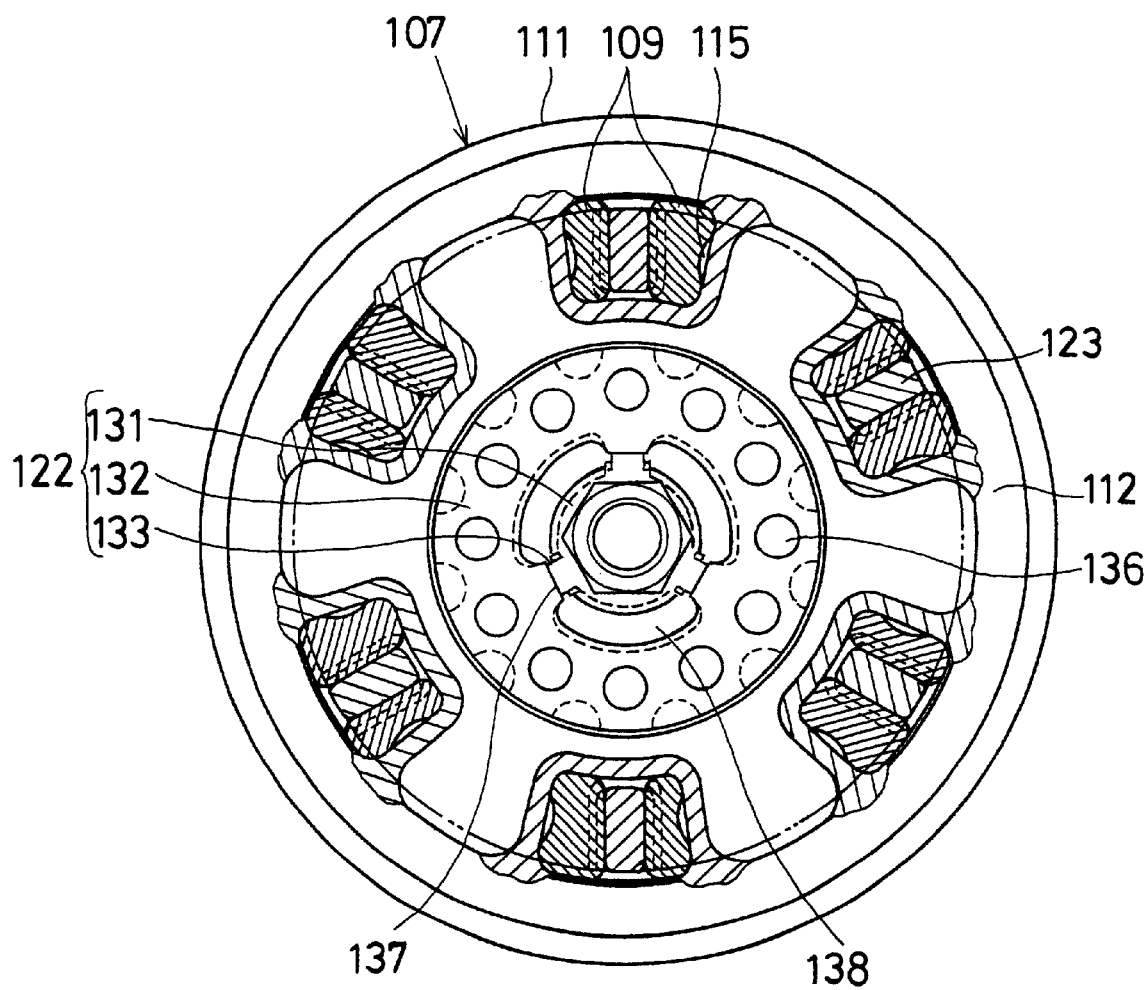
FIG. 16 is a front view showing the rotation transmitter without a resin outer hub (fifth embodiment)
Figure 17:
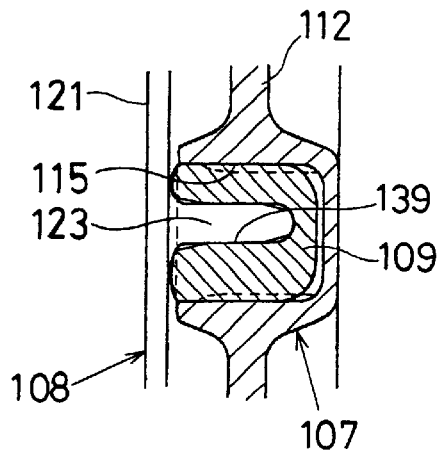
FIG. 17 is a cross-sectional view showing the portion around the rubber damper (fifth embodiment)

As shown in FIG. 17, the side wall 112 includes six axial spaces 115 into which the rubber dampers 109 are installed. As shown in FIG. 16, the axial spaces 115 are circumferentially formed at 60 degree intervals.

A discharge disc 108 is disposed in front of the side wall 112 of the pulley 107, and faces the front surface of the side wall 112. The discharge disc 108 includes an outer hub 121 and an inner hub 122. The outer hub 121 is formed at the radially outer area of the discharge disc 108, and the inner hub 122 is connected to the outer periphery of the shaft 102.

The outer hub 121 is made of thermoplastic resin such as nylon resin or made of thermosetting resin such as phenol resin. As shown in FIGS. 14 and 17, the outer hub 121 includes six projections 123 protruding rearwardly from the rear side surface thereof. The projections 123 are circumferentially located at 60 degree intervals.

The inner hub 122 is made of metal such as sintered metal, iron casting, or aluminum casting, and is inserted into the outer hub 121. The inner hub 122 includes an inner ring 131, an outer ring 132, and three bridge portions 133. The outer ring 132 is formed radially outward from the inner ring 131, and the bridge portions 133 connect the inner ring 131 with the outer ring 132.

The inner ring 131 includes a hexagon projection 134 at the front side thereof, and an internal thread 135 at the inner periphery thereof, which is screwed to an outer thread 103 of the compressor shaft 102. A tightening tool can be attached to the hexagon projection 134 to fix the inner hub 122 to the compressor shaft 102.

Figure 15:
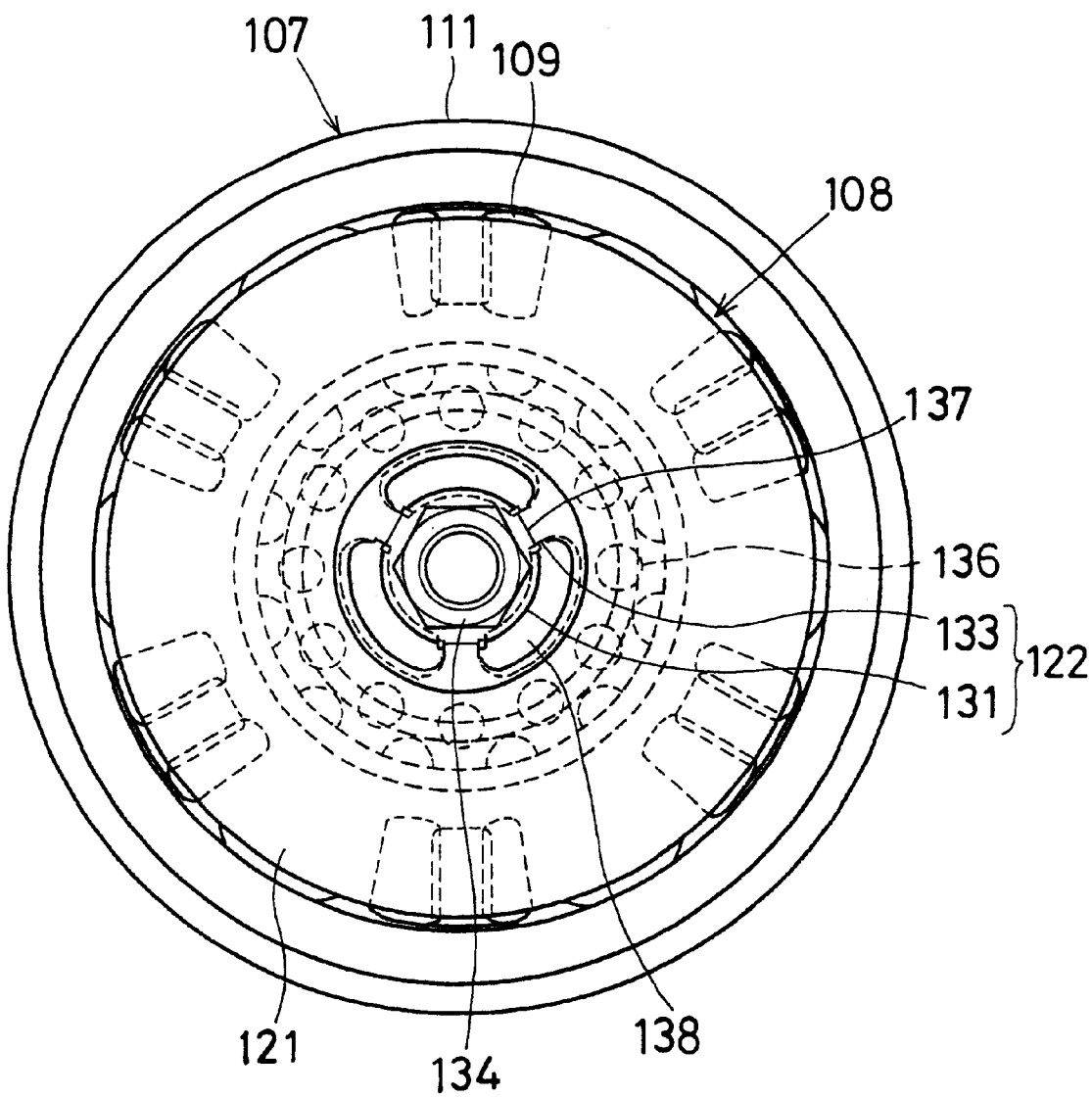
FIG. 15 is a front view showing the rotation transmitter (fifth embodiment)

Surfaces of the outer ring 132 and the bridge portions 133 are covered with the resin making the outer hub 121. As shown in FIGS. 15–16, the outer ring 132 includes twelve holes 136 for strengthening the connection between the outer ring 132 and the outer hub 121. These holes 136 are circumferentially formed at 30 degree intervals.

The bridge portions 133 radially extend from the inner ring 131 to the outer ring 132. The bridge portions 133 have break portions 137, where most of the stress caused by the torque transmission to the inner hub 122 is concentrated. The break portions 137 are formed at the inner ring 131 side root portion of the bridge portions 133, and are located between circumferential arc slits 138.

When excess load torque (for example, 40 Nm), which is larger than the usual transmission torque (for example, 10 Nm), arises at the inner hub 122 of the discharge disc 108, the break portions 137 are broken to separate the outer ring 132 of the inner hub 122 from the inner ring 131 thereof, thereby interrupting rotation transmission from the engine to the compressor shaft 102. That is, the break portions 137 form the torque limiting mechanism of the present invention.

Further, as shown in FIG. 14, the break portions 137 extend from the front surface to the rear surface of the bridge portion 133, and incline rearwardly.

Each rubber damper 109 is made of chloride butyl rubber, butadiene-styrene-rubber, natural rubber or the like, and is substantially U-shaped. As shown in FIG. 17, the rubber damper 109 defines a concave portion 139 into which a projection 123 of the outer hub 121 is inserted.

Each rubber damper 109 is installed into the corresponding axial space 115 of the side wall 112, and is pressed between the inside wall of the axial space 115 and the projection 123 to absorb torque pulsations from the pulley 107 to the discharge disc 108. Here, the rubber damper 109 is press inserted in or adhered to the axial space 115.

Next, an operation of the fifth embodiment will be explained.

While the compressor operates normally, the inner hub 122 of the discharge disc 108 is in an operable condition. When the engine operates and the crankshaft thereof rotates, the rotation force (torque) of the engine is transmitted to the cylindrical wall 111 of the pulley 107.

The rotation torque is transmitted from the axial spaces 115 to the rubber dampers 109, and further transmitted from the rubber dampers 109 to the projections 123 of the outer hub 121. Thus, the outer hub 121 rotates, and the outer ring 132, the inner ring 131 and the bridge portions 133 of the inner hub 122 rotate.

Since the internal thread 135 of the inner ring 131 is screwed to the external thread 103 of the shaft 102, the compressor shaft 102 also rotates, so that the compressor operates.

When the rotation shaft 102 locks because of seizure of the compressor, the discharge disc 108 stops rotating but the pulley 107 keeps on rotating. Thus, an excess load torque (for example, 40 Nm: shock torque), larger than the usual torque (for example, 15 Nm), arises in the inner hub 122 of the discharge disc 108.

That is, when the torque difference between the inner ring 131 and the outer ring 132 exceeds a threshold, the break portions 137 break.

Then, the outer ring 132 is separated from the inner ring 131, so that the pulley 107, the rubber dampers 109, the outer hub 121 and the outer ring 132 rotate freely from the inner ring 131. That is, the torque limiting mechanism interrupts the torque transmission from the pulley 107 to the compressor shaft 102, thereby interrupting the rotation transmission from the engine to the compressor shaft 102.

As described above, the break portions 137 incline inwardly with respect to the shaft 102 in the rearward direction. Thus, the outer hub 121, the outer ring 132 and the radial outer area of the bridge portion 133, separated from the inner ring 131, do not slide frontwardly more than the front end of the cylindrical wall 111 of the pulley 107, and they are held radially inside the cylindrical wall 111. The outer hub 121, the outer ring 132 and the radial outer area of the bridge portion 133 separated from the inner ring 131 rotate with the pulley 107 and the rubber dampers 109.

As described above, in the fifth embodiment, as the torque limiting mechanism (break portion 137) is integrally provided within the inner hub 122, the torque limiting mechanism can be attained without plural friction plates. Thus, the torque limiting mechanism is simplified, and the number of parts and assembly process for the torque limiting mechanism are reduced, thereby reducing the cost of the product.

The break portions 137, working as the torque limiting mechanism, are disposed within the cylindrical wall 111 in the axial direction. Thus, the axial dimension of the rotation transmitter can be reduced in comparison with a conventional rotation transmitter having plural friction plates, thereby reducing an entire size of the rotation transmitter.

When the rotation transmitter shares a V-belt with other auxiliary devices (for example, electric generator, water pump, power steering fluid pump, etc.), and the torque limiting mechanism operates under excess load torque, the V-belt does not wear and break, so that the auxiliary devices continuously operate.

Further, in the present fifth embodiment, the internal thread 135 of the inner hub 122 is screwed to the external thread 103 of the compressor shaft 102 for connecting the inner hub 122 to the compressor shaft 102. Thus, the axial dimension of the rotation transmitter can be reduced in comparison with the conventional rotation transmitter in which an outer spline of the compressor shaft and an inner spline of the inner hub are spline-connected, thereby reducing the entire size of the rotation transmitter.

Further, as the screw-connection is more rigid than the spline-connection, a fixing bolt is not necessary. Thus, the number of parts and assembly process for the torque rotation transmitter are reduced, thereby reducing the cost of the product.

Sixth Embodiment

Figure 18:
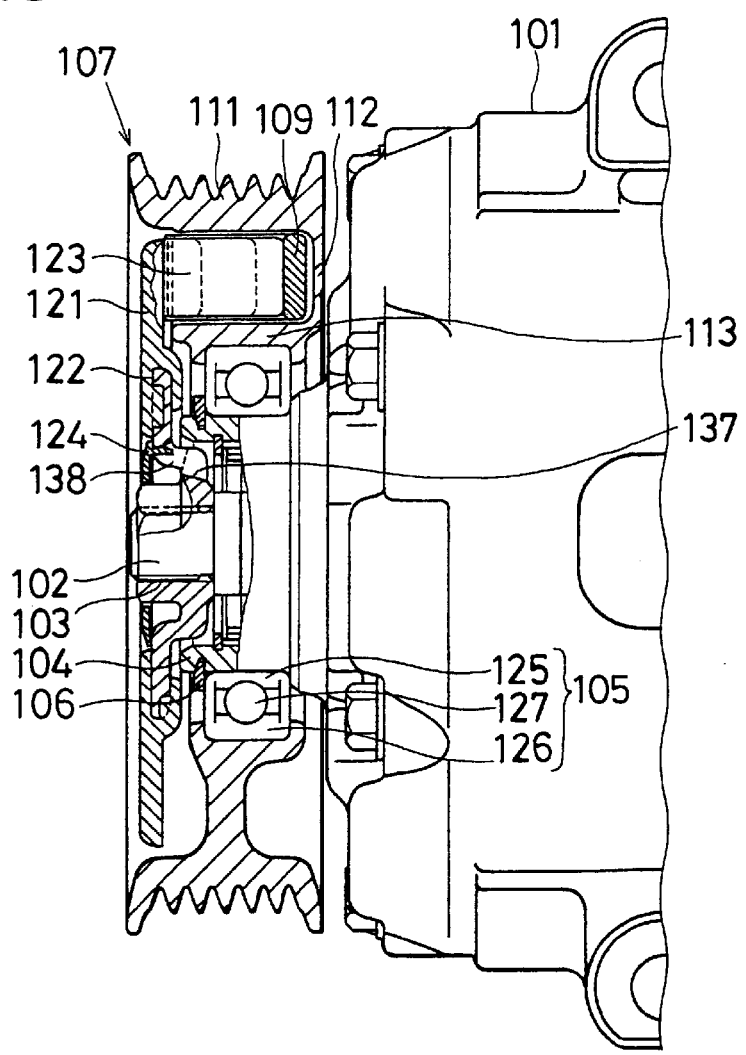
FIG. 18 is a cross-sectional view showing a rotation transmitter (sixth embodiment)

In the sixth embodiment, as shown in FIG. 18, a ring-like plate seal cover 124 is provided in front of the inner hub 122 of the discharge disc 108. The seal cover 124 covers the arc slits 138 circumferentially formed on the inner hub 122. The seal cover 124 prevents water and oil from entering into the ball bearing 105 and between the compressor shaft 102 and the housing sleeve 104. That is, the seal cover 124 prevents water from entering between the inner race 125 and the outer race 126 of the ball bearing 105 to corrode an orbital plane on which balls 127 roll, thereby improving the life span of the ball bearing 105.

Seventh Embodiment

In the seventh embodiment, as shown in FIGS. 19–22, the metal inner hub 142 is insert-formed into the resin outer hub 141 to form the discharge disc 108. As in the fifth embodiment, the outer hub 141 includes six projections 143 protruding rearwardly from the rear side surface thereof (see FIGS. 19 and 22). These projections 143 are circumferentially provided at 60 degree intervals.

Figure 22:
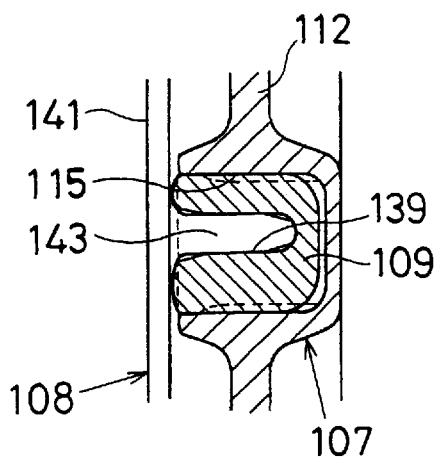
FIG. 22 is a cross-sectional view showing the portion around the rubber damper (seventh embodiment)

Each rubber damper 109 includes, as in the fifth embodiment, concave portions 139 into which the corresponding projection 143 are inserted (see FIG. 22). Further, the outer hub 141 includes three thin portions 144 at the radial inner side thereof. The thin portions 144 are provided for allowing break portions 157 to be easily broken even when high-strength resin material enters into arc slits 158 of the inner hub 142. Details of the break portions 157 and the arc slits 158 will be described thereafter.

The inner hub 142 includes, as in the fifth embodiment, an inner ring 151, an outer ring 152, and three bridge portions 153. The outer ring 152 is formed radially outward from the inner ring 151, and the bridge portions 153 connect the inner ring 151 with the outer ring 152.

The inner ring 151 includes a hexagon projection 154 at the front side thereof, and an internal thread 155 at the inner periphery thereof, which is screwed to the outer thread 103 of the compressor shaft 102. A tightening tool attaches to the hexagon projection 154 to fix the inner hub 142 to the compressor shaft 102.

Figure 20:
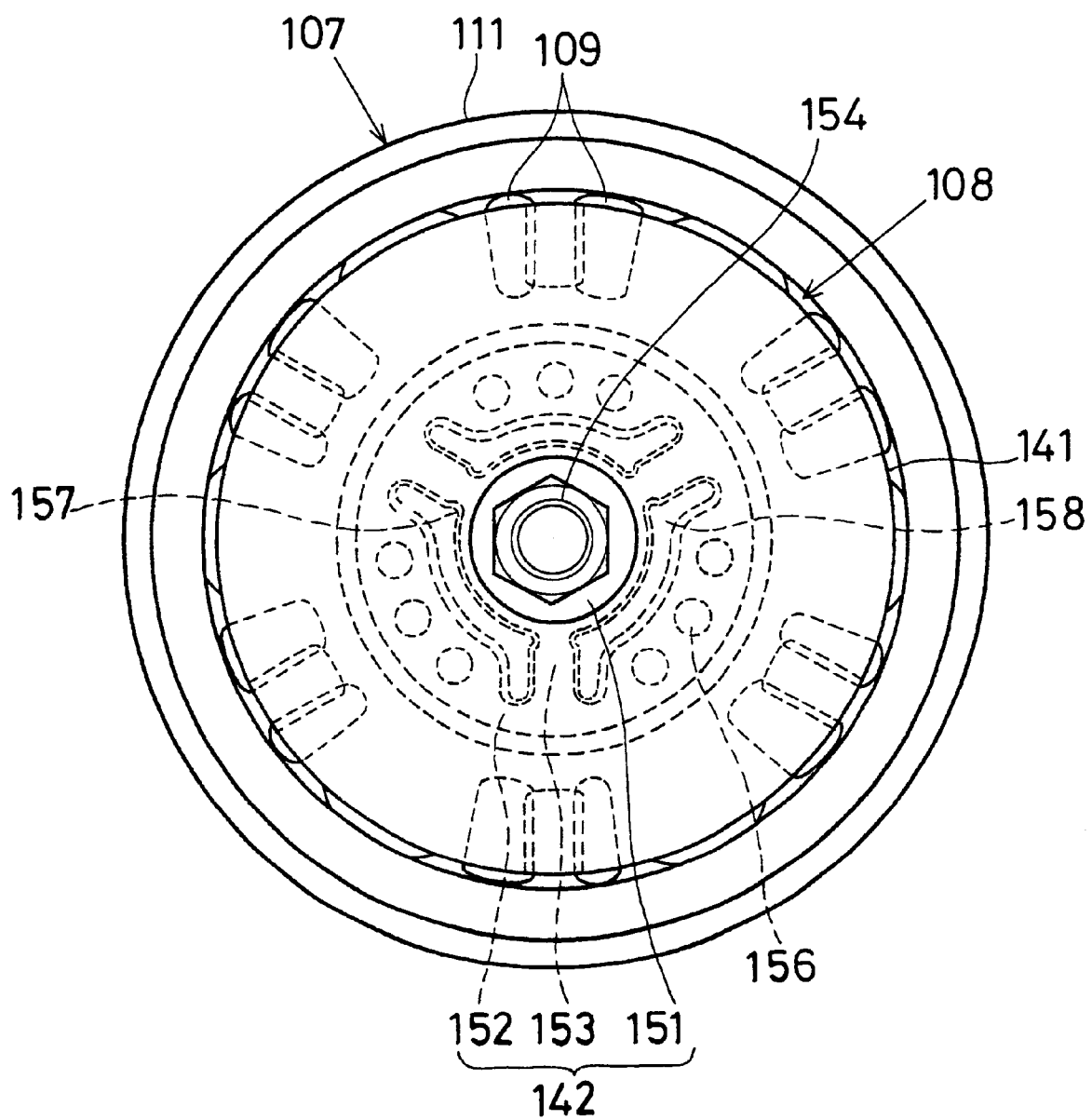
FIG. 20 is a front view showing the rotation transmitter (seventh embodiment)
Figure 21:
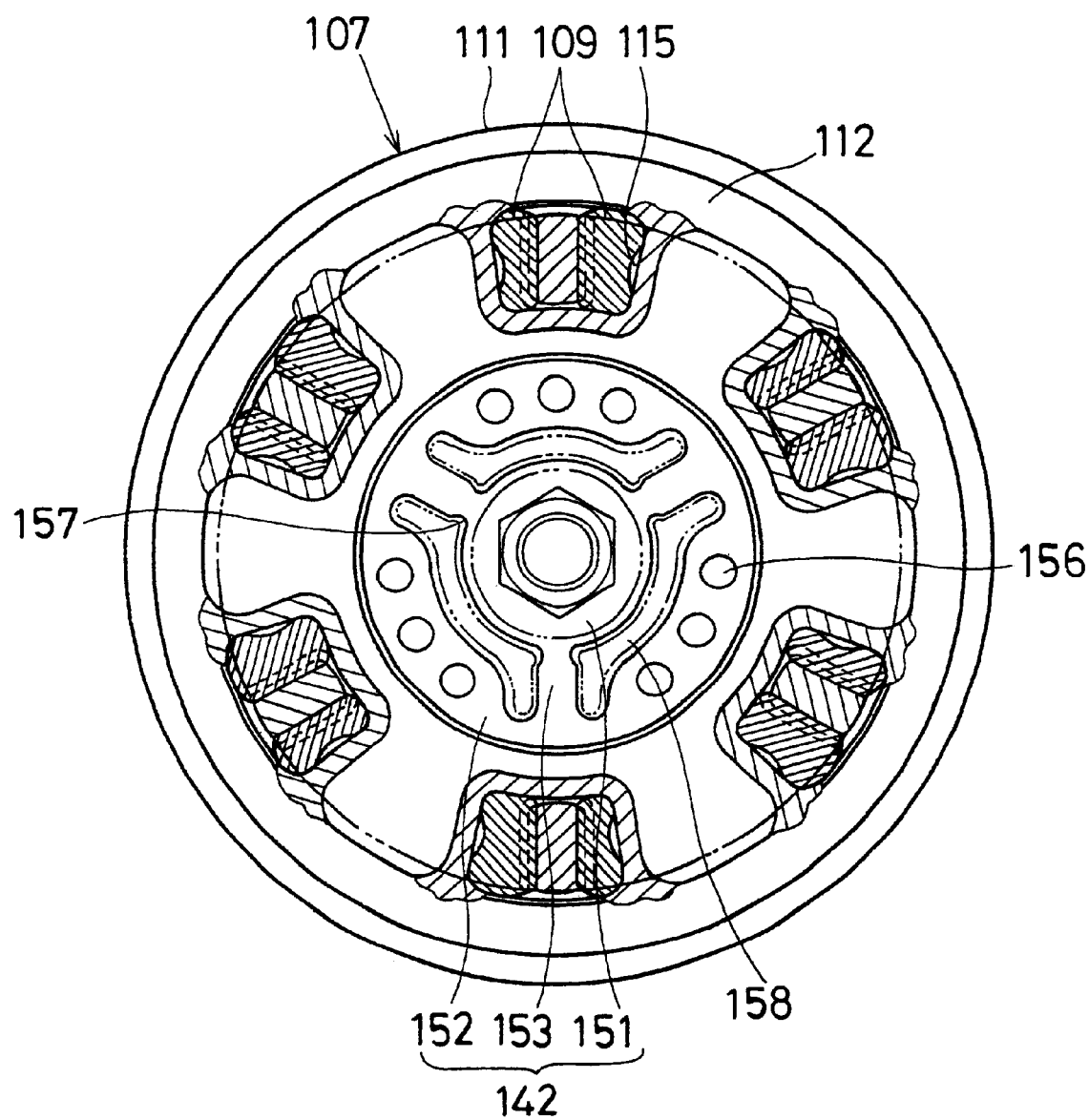
FIG. 21 is a front view showing the rotation transmitter without a resin outer hub (seventh embodiment)

Surfaces of the outer area of the inner ring 151, the outer ring 152 and the bridge portion 153 are covered with the resin making the outer hub 141. As shown in FIG. 20, the outer ring 152 includes nine holes 156 for strengthening connection between the outer ring 152 and the outer hub 141.

The bridge portions 153 extend radially from the inner ring 151 to the outer ring 152. The bridge portions 153 have the break portions 157, which are formed relatively thin and where most of stress caused by the torque transmission to the inner hub 122 concentrates. The break portions 157 are formed by cutting off the inner ring 151 side root portion of the bridge portion 153, and are circumferentially provided between adjacent arc slits 158.

Figure 19:
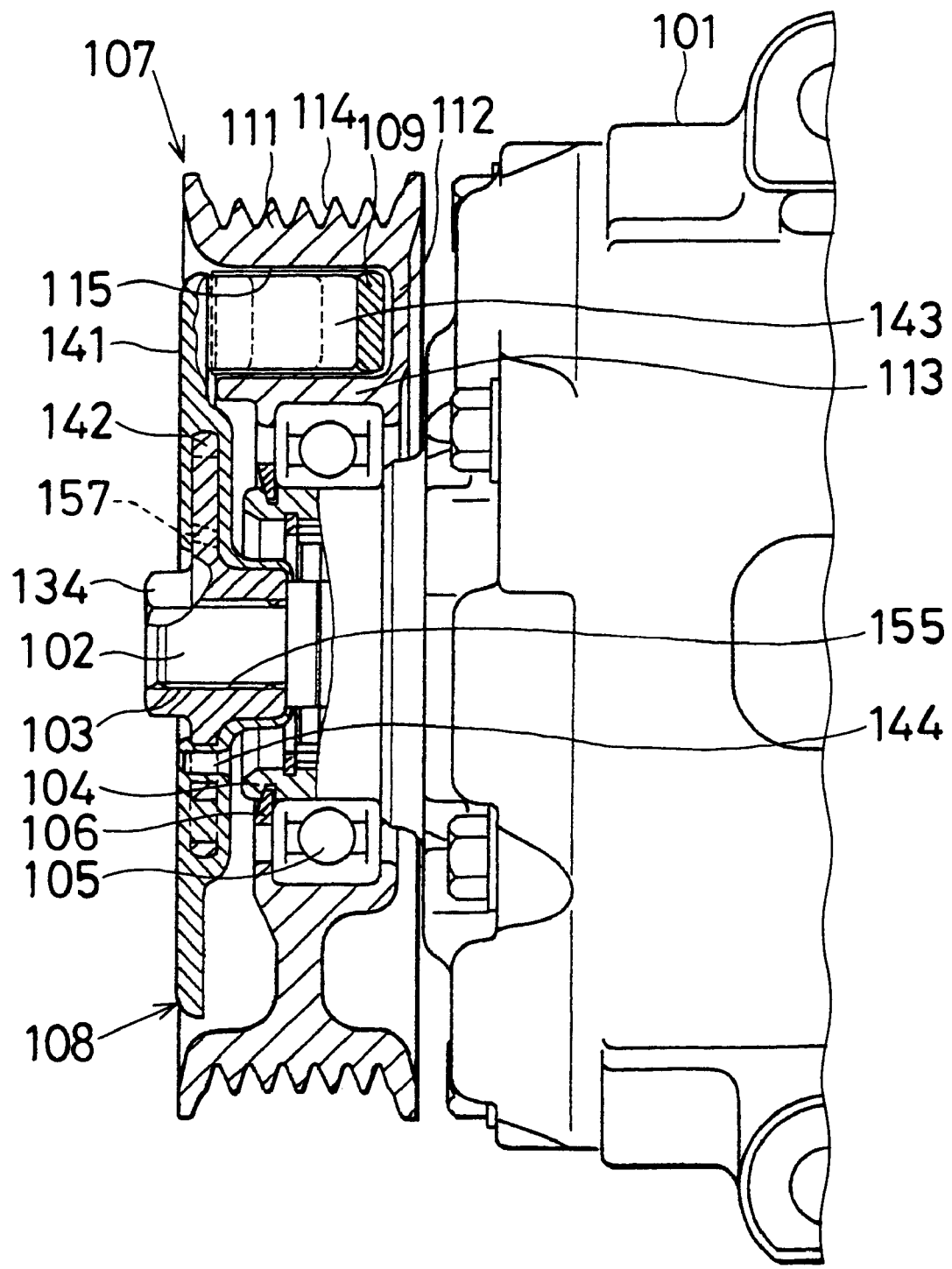
FIG. 19 is a cross-sectional view showing a rotation transmitter (seventh embodiment)

Further, as shown in FIG. 19, the break portions 157 extend from the front surface to the rear surface of the bridge portion 153, and incline rearwardly.

When excess load torque (for example, 40 Nm), larger than the usual transmission torque (for example, 10 Nm), arises at the inner hub 142 of the discharge disc 108, the break portions 157 are broken to separate the outer ring 152 of the inner hub 142 from the inner ring 151 thereof, thereby interrupting rotation transmission from the engine to the compressor shaft 102. That is, the break portions 157 form the torque limiting mechanism of the present invention.

In the fifth through seventh embodiments, the break portions 137, 157 may be alternatively formed by thinning the circumferential dimension between the adjacent arc slits 138, 158, or by providing area surrounded by lots of slits.

Eighth Embodiment

Figure 23:
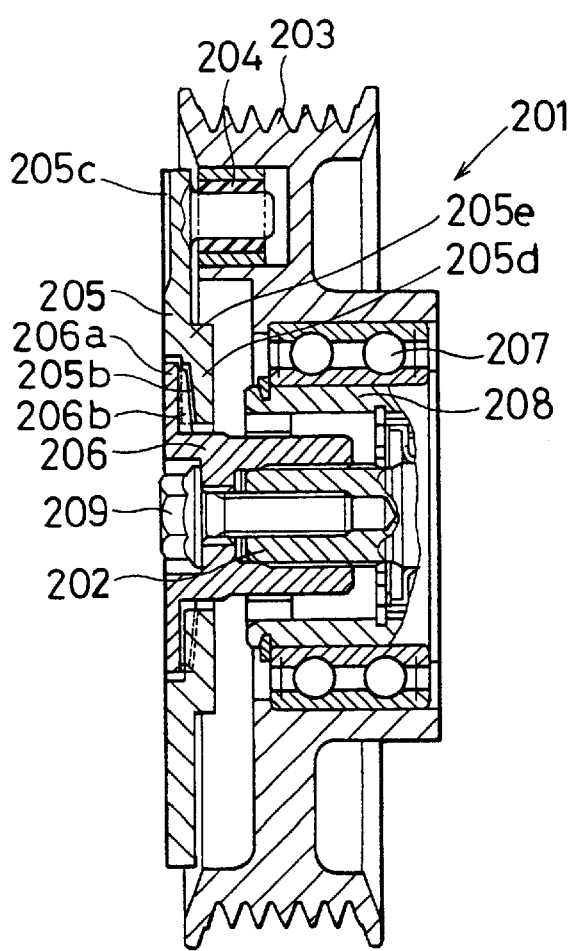
FIG. 23 is a cross-sectional view showing a rotation transmitter (eighth embodiment)
Figure 24:
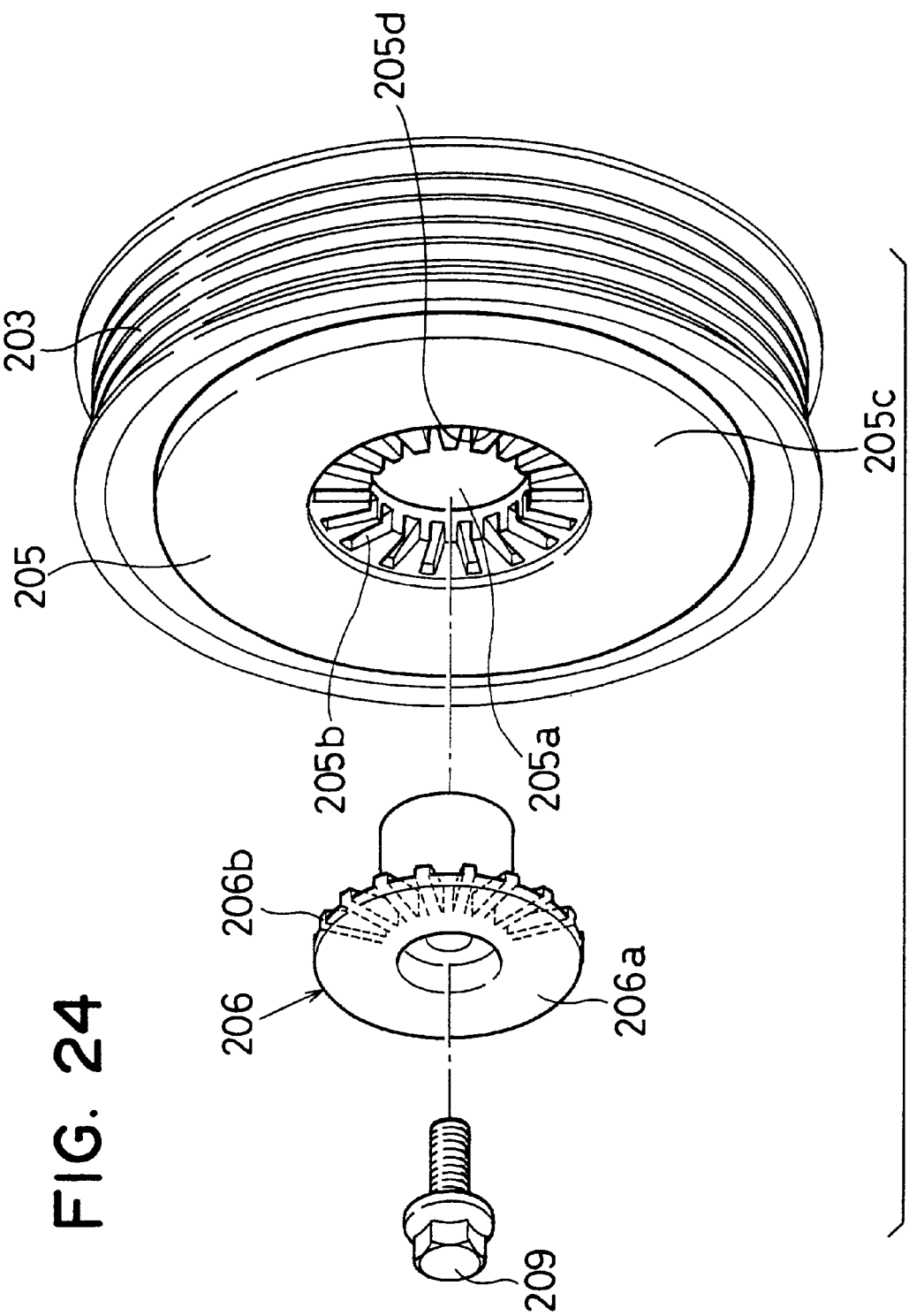
FIG. 24 is a perspective view showing an inner hub and an outer hub (eighth embodiment)

FIGS. 23 and 24 show the eighth embodiment, and FIG. 23 shows a cross-sectional view of a rotation transmitter 201.

The rotation transmitter 201 transmits rotation force from a vehicle engine to a compressor shaft 202. The rotation transmitter 201 includes a pulley 203, an outer hub 205, and an inner hub 206. The pulley 203 rotates by receiving the rotation force from the engine. The outer hub 205 is connected to the pulley 203 through a plurality of rubber dampers 204. The inner hub 206 is connected to the outer hub 205 and the compressor shaft 202.

The pulley 203 is made of metal such as iron steel, and is rotatably supported by a compressor housing 208 through a bearing 207. While the engine operates, the rotation force is always transmits to the pulley 203 through a V-belt (not illustrated) to rotate the pulley 203.

A plurality of rubber dampers 204 are circumferentially provided between the pulley 203 and the outer hub 205, and absorb torque pulsations from the compressor shaft 202.

The outer hub 205 is made of metal such as iron steel, and is shaped in a ring to have a circle hole 205$a$ (see FIG. 24) at the center thereof. The outer hub 205 rotates with the pulley 203 and the rubber dampers 204. The outer hub 205 includes, as shown in FIG. 23, a step 205$e$ between the radial outer area 205$c$ and the radial inner area 205$d$ thereof. The radial inner area 205$d$ is disposed at the compressor side (right side in FIG. 23) as compared to the radial outer area 205$c$. The inner area 205$d$ includes, as shown in FIG. 24, plural slits 205b on the front surface thereof. The slits 205b radially extend around the circular hole 205a.

The inner hub 206 is spline-connected to the compressor shaft 202, and a bolt 209 fixes the inner hub 206 to the compressor shaft 202. The inner hub 206 includes a flange 206a axially facing the inner area 205d of the outer hub 205. The flange 206a includes plural ribs 206b projecting from the back surface thereof which face the radial inner area 205d of the outer hub 205. The ribs 206b radially extend and correspond to the slits 205b of the outer hub 205 (see FIG. 24).

As shown in FIG. 23, the ribs 206b are inserted between the slits 205b to connect the inner hub 206 to the outer hub 205. Thus, the outer hub 205 and the inner hub 206 rotate together.

The inner hub 206 is made of resin or sintered metal having a breaking strength which is one-fourth or less of the fatigue strength thereof. The repeated loading of driving torque pulsations from the compressor act on the ribs 206b of the inner hub 206. Thus, the inner hub 206 is designed so that the endurance limit of the resin or sintered metal making the inner hub 206 is more than the maximum stress caused by the repeated loading.

Next, the operation of the eighth embodiment will be explained.

The rotation force of the engine is transmitted through the V-belt, the pulley 203, the rubber dampers 204, the outer hub 205, and the inner hub 206, and to the compressor shaft 202, so that the compressor shaft 202 rotates.

When the rotation shaft 202 locks because the compressor seizes, excess load torque (shock torque) arises between the outer hub 205 and the inner hub 206. At this time, the stress caused by the excess load torque mainly acts on the root area of the ribs 206b of the inner hub 206. When the stress exceeds the endurance limit of the inner hub 206, the ribs 206b are broken to separate the inner hub 206 therefrom, so that the outer hub 205 is separated from the inner hub 206. Thus, the torque transmission from the outer hub 205 to the inner hub 206 is interrupted, thereby preventing the excess torque pulsation from being transmitted to the vehicle engine.

As described above, the torque limiting mechanism can be attained by the outer and inner hubs 205, 206 without adding supplemental parts. Thus, the torque limiting mechanism is simplified, and the number of parts therefor is reduced, thereby reducing an entire size of the rotation transmitter having the torque limiting mechanism.

Ninth Embodiment

Figure 25:
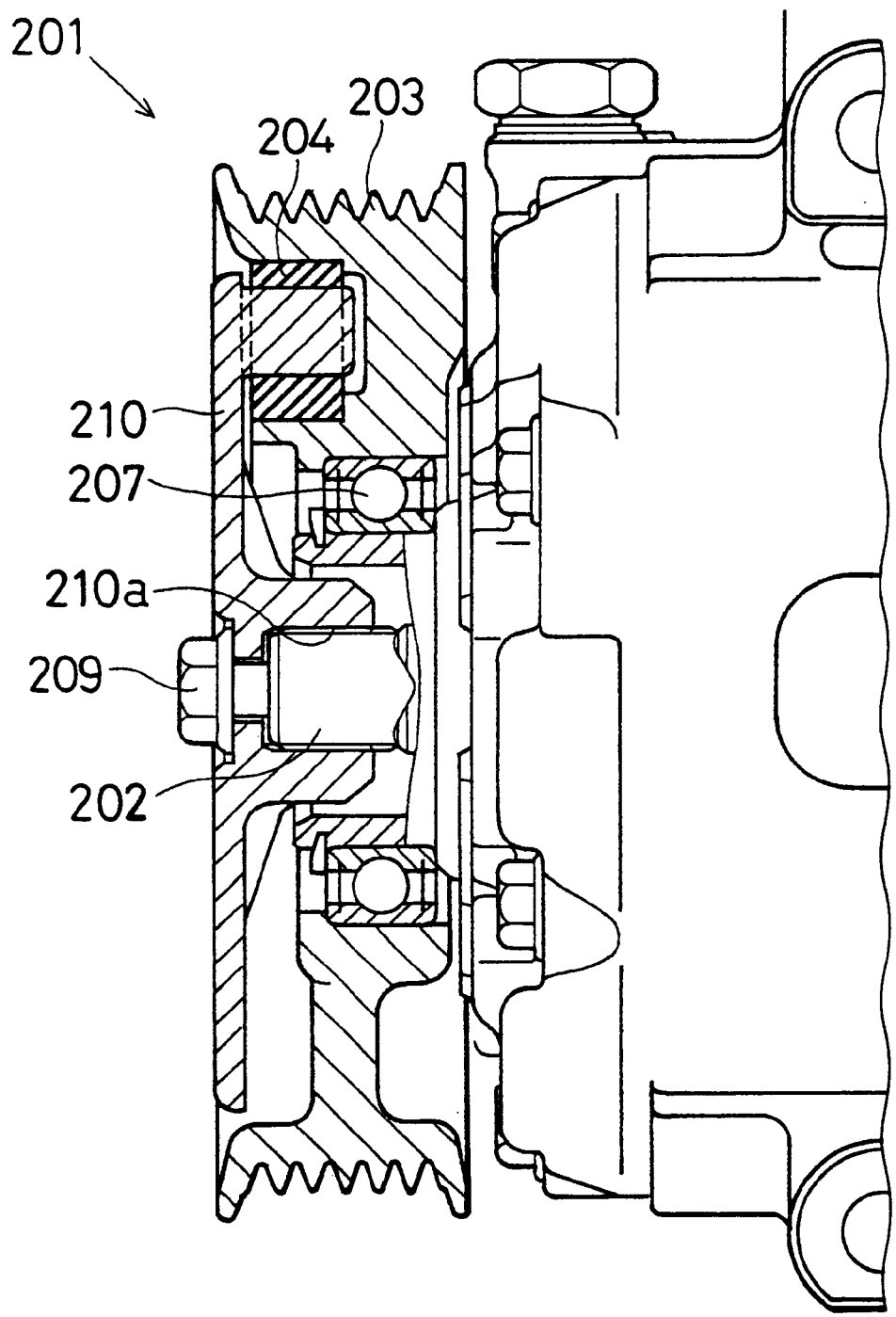
FIG. 25 is a cross-sectional view showing a rotation transmitter (ninth embodiment)

In the ninth embodiment, as shown in FIG. 25, the rotation transmitter 201 includes a hub 210 in which the outer and inner hubs are integrated. The hub 210 is made of resin or sintered metal. The hub 210 is spline-connected to the shaft 202 at the spline portion 210a thereof.

When the shaft 202 is locked, the stress mainly acts on the spline portion 210a to break the spline portion 210a. Thus, the hub 210 is disconnected from the shaft 202, thereby interrupting the torque transmission therebetween.

Figure 26A:
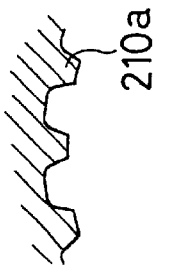
FIGS. 26A–26D are cross-sectional views showing spline portions of the resin hub (ninth embodiment)
Figure 26B:
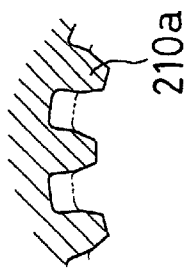
Figure 26C:
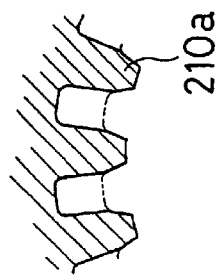

Here, when the shaft 202 is locked, the spline 210a of the hub 210 must be broken with certainty. For this, as shown in FIGS. 26B and 26C, the teeth of the spline 210a may be set higher than those as in a normal spline 210a shown in FIG. 26A to increase the stress concentration onto the teeth roots of the spline 210a.

Figure 26D:
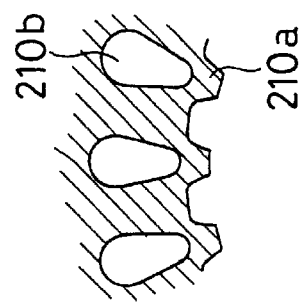

Alternatively, as shown in FIG. 26D, plural spaces 210b may be provided radially inside the spline 210a to increase the stress concentration onto the teeth roots of the spline 210a.

Tenth Embodiment

Figure 27:
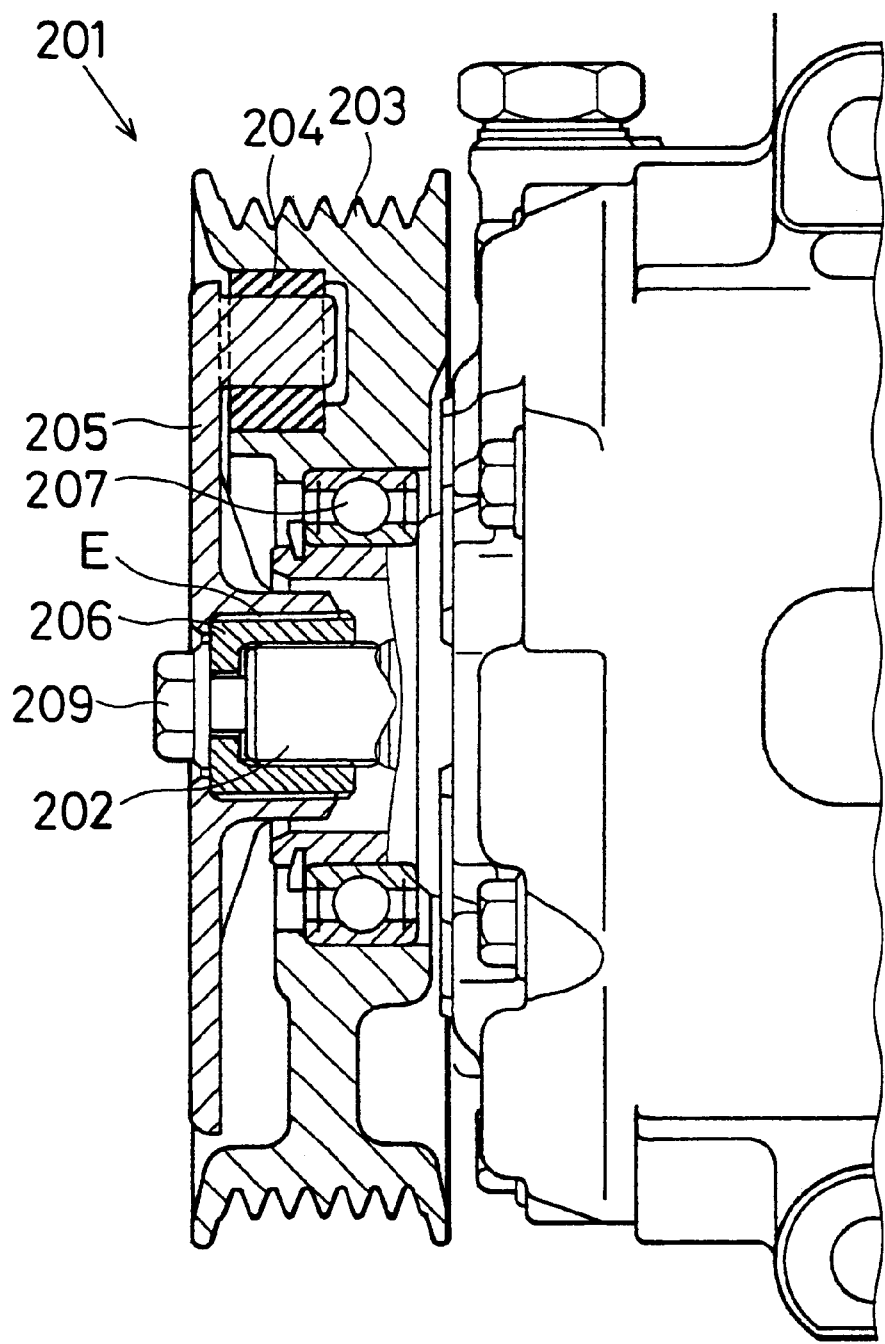
FIG. 27 is a cross-sectional view showing a rotation transmitter (tenth embodiment)

In the tenth embodiment, as shown in FIG. 27, the rotation transmitter 201 includes an outer hub 205 made of resin and an inner hub 206 made of metal such as iron steel. The outer hub 205 is connected to the pulley 203 through rubber dampers 204. The inner hub 206 is insert-formed inside the outer hub 205, and spline-connected to the shaft 202.

Figure 28:
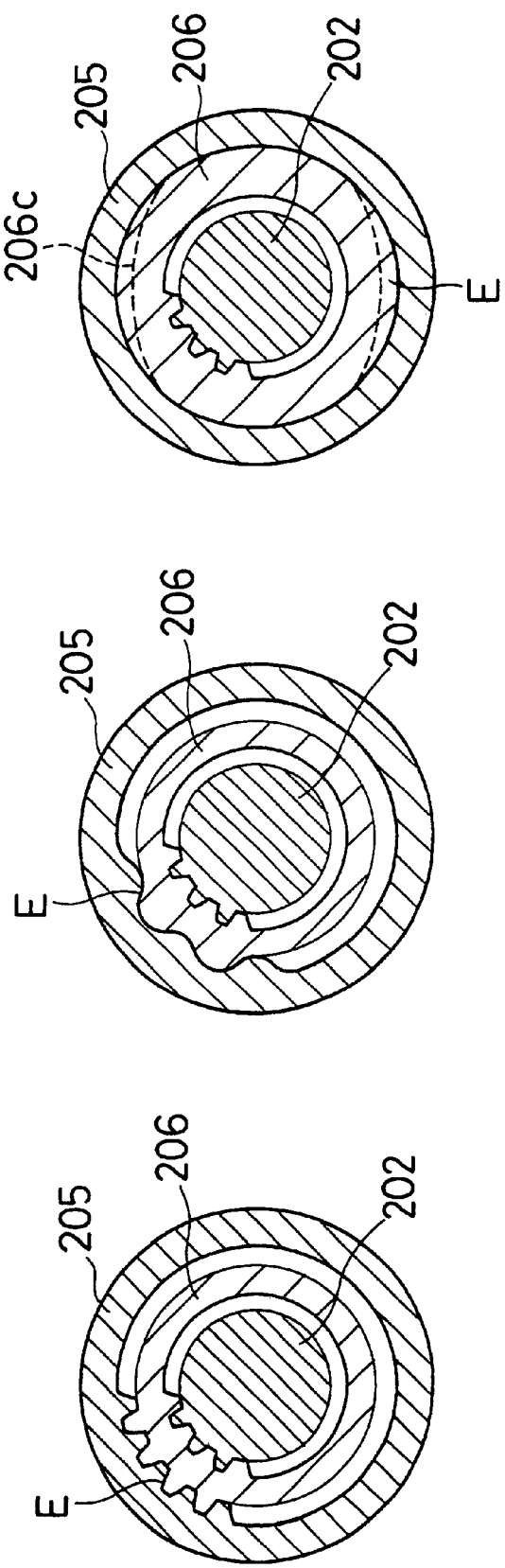
FIGS. 28A–28C are cross-sectional views showing rotation restriction mechanisms (tenth embodiment)

As shown in FIGS. 28A–28C, a rotation restriction mechanism E is provided between of the outer hub 205 and the inner hub 206 to prevent the outer hub 205 from sliding against the inner hub 206.

Here, FIG. 28A shows first example of the rotation restriction mechanism E in which splines formed on the inner periphery of the outer hub 205 and on the outer periphery of the inner hub 206 engage with each other. FIG. 28B shows second example in which wave like concave-convex portions engage with each other. FIG. 28C shows third example in which the outer hub 205 is inserted into eccentric grooves 206c provided at the outer surface of the inner hub 206.

When the shaft 202 locks, the stress mainly acts on the rotation restriction mechanism E of the outer hub 205 made of resin to break it. Thus, the outer hub 205 is disconnected from the inner hub 206, thereby interrupting the torque transmission therebetween.

Eleventh Embodiment

Figure 29:
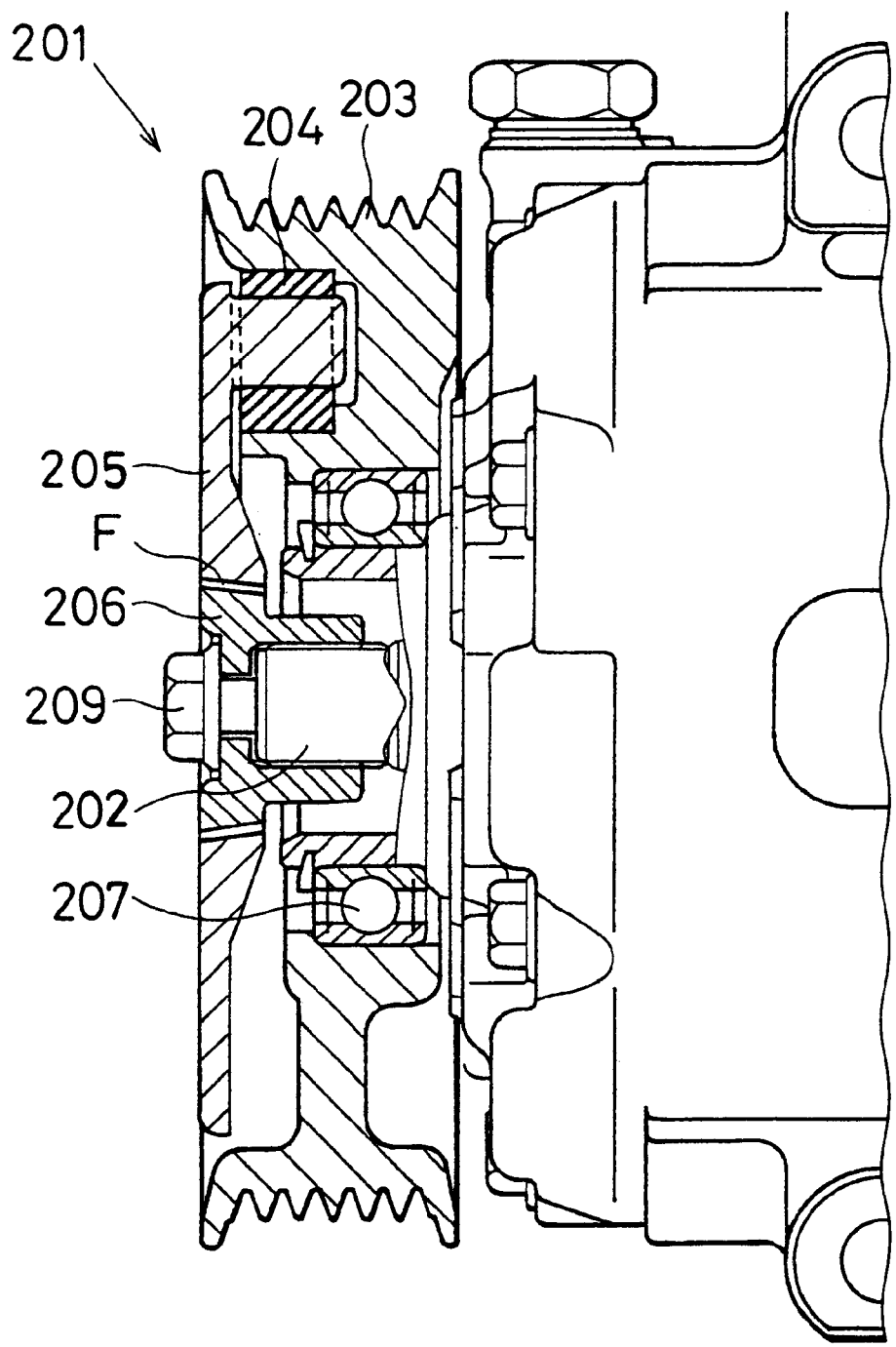
FIG. 29 is a cross-sectional view showing a rotation transmitter (eleventh embodiment)

In the eleventh embodiment, as shown in FIG. 29, the rotation transmitter 201 includes an outer hub 205 made of resin and an inner hub 206 made of metal.

The outer hub 205 and the inner hub 206 are individually formed (not insert-formed), and connected with each other by rotation restriction mechanism F. The rotation restriction mechanism F is constructed as in the tenth embodiment (see FIGS. 28A–28C), and inclines with respect to the axial direction to taper rearwardly.

When the shaft 202 locks, the stress mainly acts on the rotation restriction mechanism F of the outer hub 205 made of resin to break it. Thus, the outer hub 205 is disconnected from the inner hub 206, thereby interrupting the torque transmission therebetween.

Further, the rotation restriction mechanism F inclines with respect to the axial direction, thereby improving the stability of the assembled outer and inner hubs 205 and 206.

Twelfth Embodiment

Figure 30:
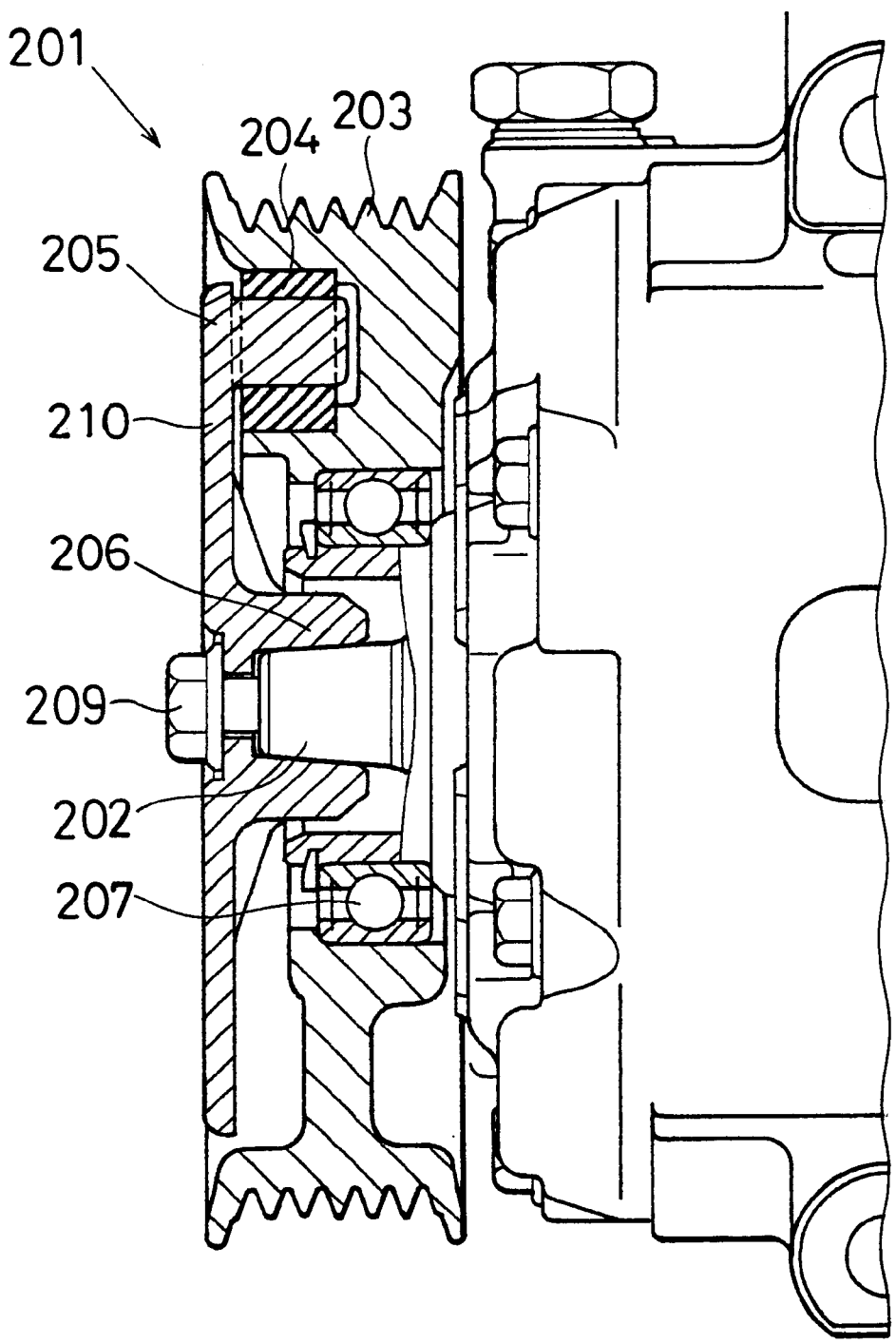
FIG. 30 is a cross-sectional view showing a rotation transmitter (twelfth embodiment)

In the twelfth embodiment, as shown in FIG. 30, the rotation transmitter 201 includes a hub 210 in which the outer and inner hubs 205, 206 are integrated.

The hub 210 is made of resin, and taper-connected to the shaft 202.

When the shaft 202 locks, the taper-connection surface of the hub 205 slips against the taper surface of the shaft 202, and friction heat arises therebetween. Thus, the taper-connection surface of the hub 210 wears down, and the hub 205 is disconnected from the shaft 202, thereby interrupting the torque transmission therebetween.

Thirteenth Embodiment

Figure 31:
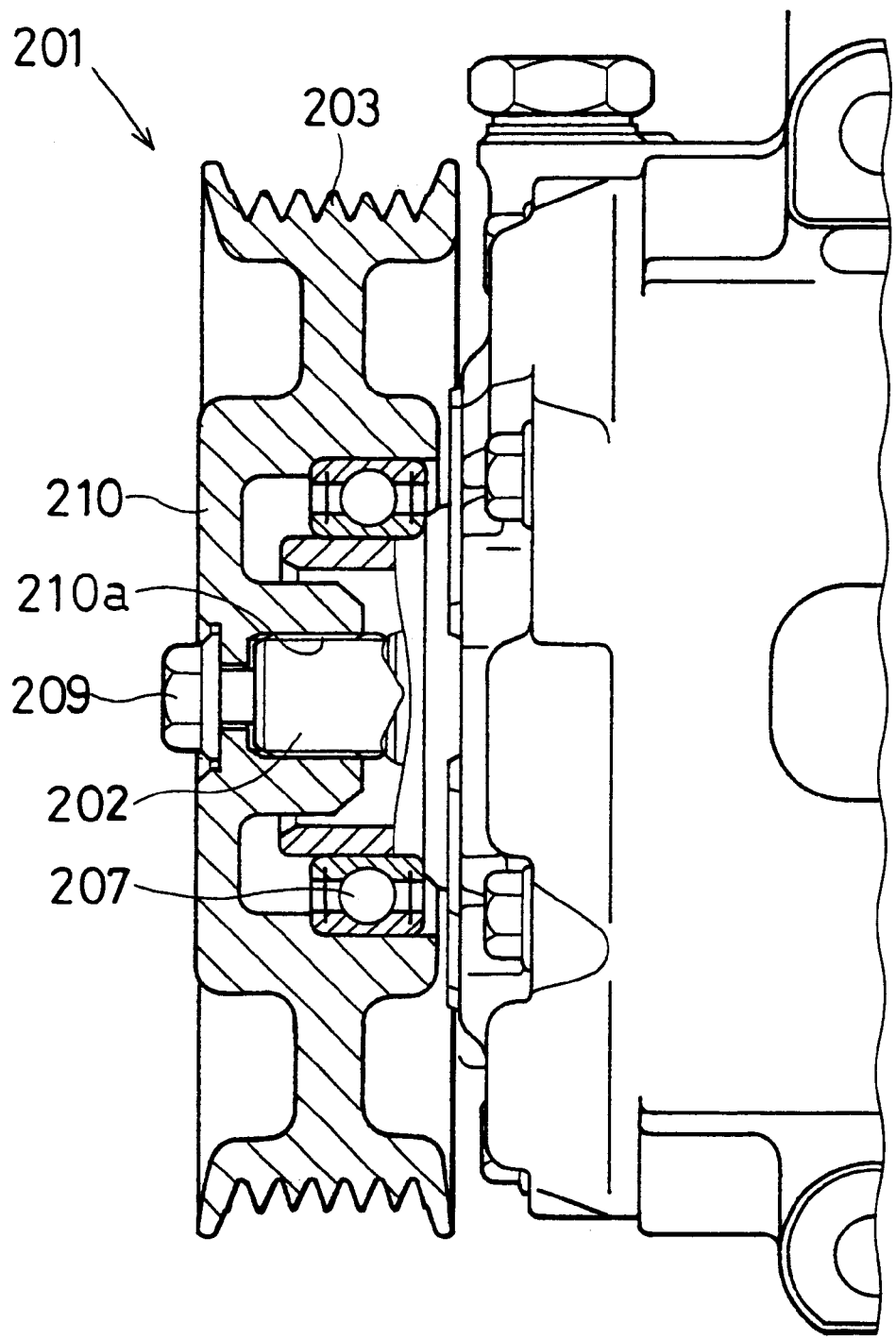
FIG. 31 is a cross-sectional view showing a rotation transmitter (first example of thirteenth embodiment)
Figure 32:
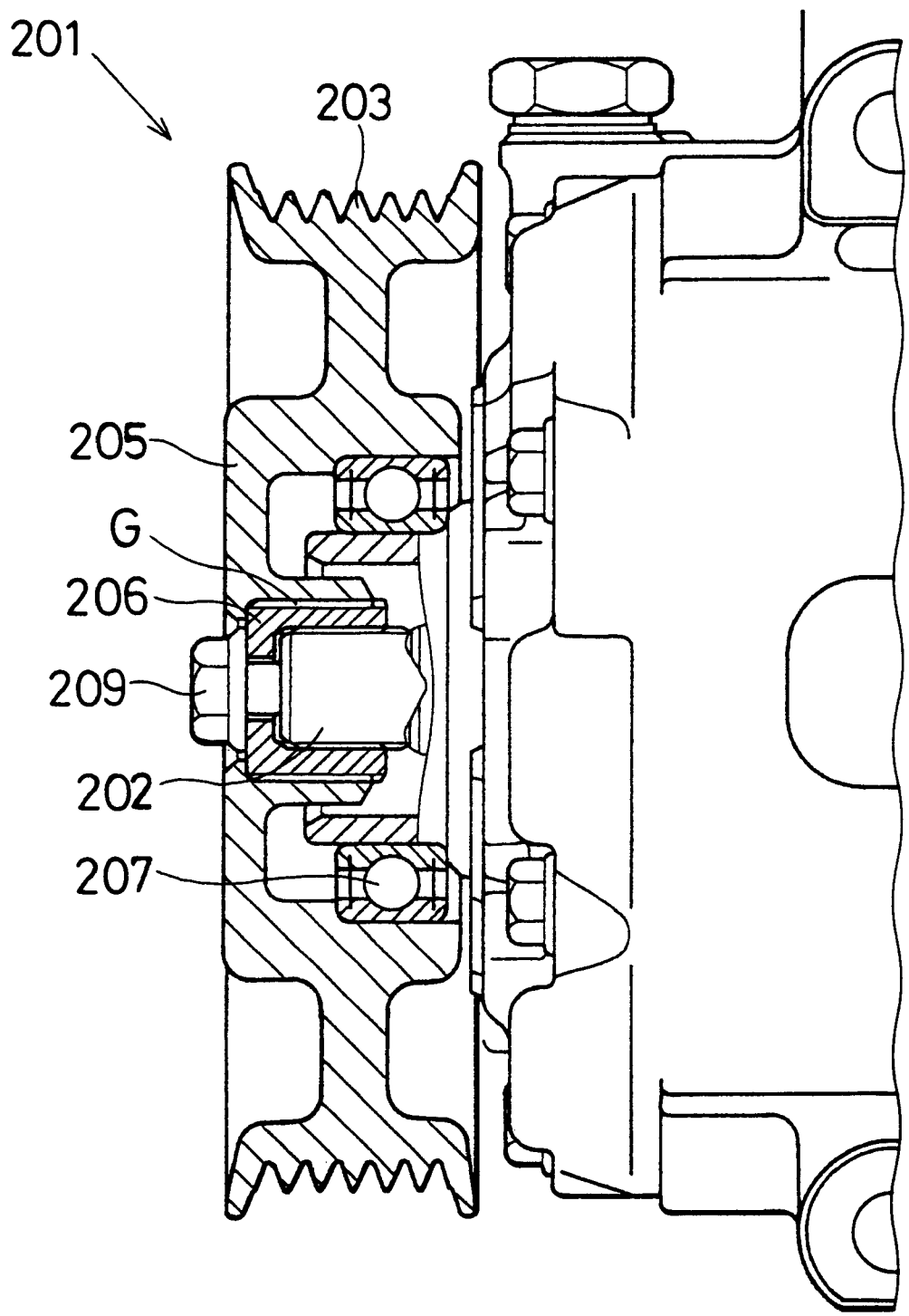
FIG. 32 is a cross-sectional view showing a rotation transmitter (second example of thirteenth embodiment)
Figure 33:
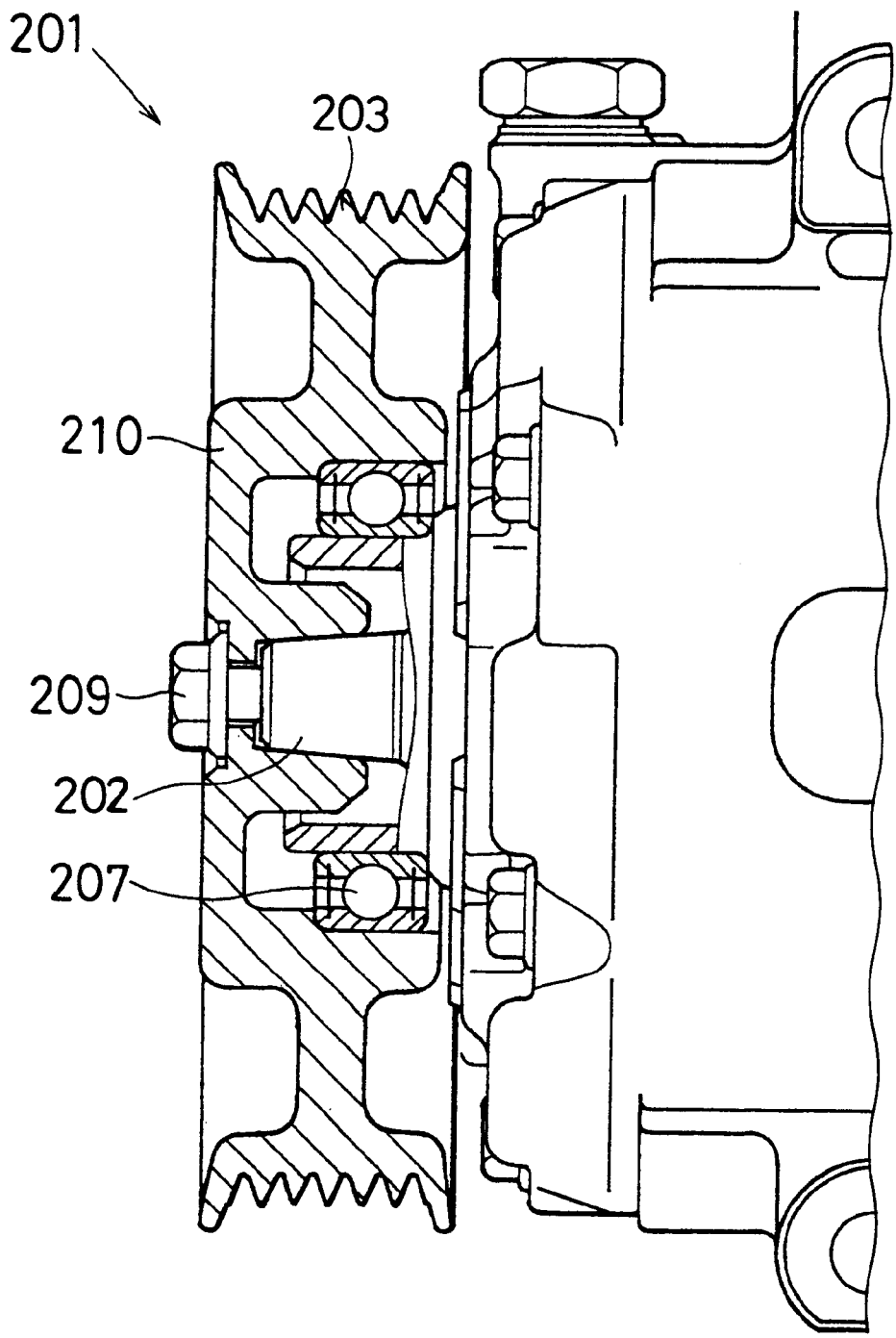
FIG. 33 is a cross-sectional view showing a rotation transmitter (third example of thirteenth embodiment).

FIGS. 31–33 show the thirteenth embodiment. In the thirteenth embodiment, the pulley 203 is made of resin to dispense with the rubber dampers. Inertia moment of the resin pulley 203 is smaller than that of metal pulley. Thus, the resin pulley 203 suppresses the torque pulsations of the compressor without the rubber dampers.

In a first example, as shown in FIG. 31, the hub 210 is integrated with the pulley 203. The hub 210 is spline-connected to the shaft 202 as in the ninth embodiment. When the shaft 202 locks, the spline portion 210a of the hub 210 is broken, so that the hub 210 is disconnected from the shaft 202, thereby interrupting the torque transmission therebetween.

In a second example, as shown in FIG. 32, the outer hub 205 is integrated with the pulley 203. The outer hub 210 is connected to the inner hub 206 by a rotation restriction mechanism G as in the tenth or eleventh embodiment. When the shaft 202 locks, the stress mainly acts on the rotation restriction mechanism G of the outer hub 205 made of resin to break it. Thus, the outer hub 205 is disconnected from the inner hub 206, thereby interrupting the torque transmission therebetween.

In a third example, as shown in FIG. 33, the hub 210 is integrated with the pulley 203. The hub 210 is taper-connected to the shaft 202 as in the twelfth embodiment. When the shaft 202 locks, the taper-connection surface of the hub 210 wears down, and the hub 205 is disconnected from the shaft 202, thereby interrupting the torque transmission therebetween.

Modifications

In the above-described embodiments, the present invention is applied to the rotation transmitter installed in the vehicle engine compartment to transmit the rotation force from the engine to the compressor. Alternatively, the present invention may be applied to a rotation transmitter used for a combustion engine or an electric motor, which is disposed in a factory.

In the above-described embodiments, the multistage V-belt is used. Alternatively, a single stage V-belt may be used.

In the above-described embodiments, the present invention is applied to a rotation transmitter including a torque limiting mechanism, which transmits the rotation force to a compressor used for an automotive air conditioner. Alternatively, the present invention may be applied to a rotation transmitter used for another rotary device such as electric generator, water pump, oil pressure pump, blower, or fan.

What is claimed is:

1. A rotation transmitter, comprising:

a pulley including a cylindrical wall; and a hub rotating by receiving rotation force from said pulley, said hub including a torque limiting mechanism to interrupt rotation transmission from said pulley to said hub when a torque difference between said pulley and said hub exceeds a threshold, wherein said torque limiting mechanism is disposed within an axial dimension of said cylindrical wall;

said torque limiting mechanism includes a break portion to be broken to interrupt the rotation transmission from said pulley to said hub when the torque difference between said pulley and said hub exceeds said threshold;

said break portion is provided at a particular position where stress caused by torque transmission to said hub mainly acts;

said rotation transmitter is used for a rotary machine;

said rotation transmitter further includes a connection portion connecting to a rotating shaft of said rotary machine; and said connection portion is provided radially inwardly from said particular position.

2. A rotation transmitter according to claim 1, wherein said connection portion includes a projection to which a tightening tool is attached.

3. A rotation transmitter, comprising:

a pulley including a cylindrical wall; and a hub rotating by receiving rotation force from said pulley, said hub including a torque limiting mechanism to interrupt rotation transmission from said pulley to said hub when a torque difference between said pulley and said hub exceeds a threshold, wherein said torque limiting mechanism is disposed within an axial dimension of said cylindrical wall;

said torque limiting mechanism includes a break portion to be broken to interrupt the rotation transmission from said pulley to said hub when the torque difference between said pulley and said hub exceeds said threshold;

said rotation transmitter is used for a rotary machine; and said hub includes an inner hub connected to a rotating shaft of said rotary machine, and an outer hub provided radially outward of said inner hub and connected to said inner hub.

4. A rotation transmitter according to claim 3, wherein said inner hub includes an inner ring connected to said rotating shaft, an outer ring located radially outward of said inner ring, and a bridge portion connecting said inner ring with said outer ring.

5. A rotation transmitter according to claim 4, wherein said break portion is provided at a connection point between said inner ring and said bridge portion.

6. A rotation transmitter according to claim 4, wherein said break portion is provided at a connection point between said outer ring and said bridge portion.

7. A rotation transmitter according to claim 4, wherein said break portion is provided in said bridge portion.

8. A rotation transmitter according to claim 4, wherein said inner hub includes an internal thread at an inner periphery thereof, which connects to an external thread of said rotating shaft.

9. A rotation transmitter according to claim 3, wherein said inner hub includes a plurality of holes to strengthen a connection between said outer hub and said inner hub.

* * * * *